US012638541B2

(12) United States Patent
Saputra et al.

(10) Patent No.: US 12,638,541 B2
(45) Date of Patent: May 26, 2026

(54) INTELLIGENT DYNAMIC MULTI LEAD MECHANISM WITH ANCHOR-LESS ULTRA WIDEBAND

(71) Applicant: SAMSUNG ELECTRONICS CO., LTD., Suwon-si (KR)

(72) Inventors: Muchlisin Adi Saputra, Jakarta (ID); Fikriansyah Adzaka, Jakarta (ID); Eggy Bond Ompusunggu, Jakarta (ID); Devi Kumala, Jakarta (ID); Andri Mirandi, Jakarta (ID); Junaidillah Fadlil, Jakarta (ID); Achmad Iman Supriyanto, Jakarta (ID)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 676 days.

(21) Appl. No.: 17/987,489

(22) Filed: Nov. 15, 2022

(65) Prior Publication Data

US 2023/0204710 A1    Jun. 29, 2023

Related U.S. Application Data

(63) Continuation of application No. PCT/KR2022/014250, filed on Sep. 23, 2022.

(30) Foreign Application Priority Data

Dec. 23, 2021    (ID) .............................. P00202111994

(51) Int. Cl.
*G01S 5/02*         (2010.01)
*G01S 5/00*         (2006.01)
(52) U.S. Cl.
CPC .......... *G01S 5/0289* (2013.01); *G01S 5/0072* (2013.01); *G01S 5/0264* (2020.05); *G01S 5/0294* (2013.01)

(58) Field of Classification Search
CPC .... G01S 5/0289; G01S 5/0164; G01S 5/0072; G01S 5/0294; G01S 5/0242; G01S 5/0249; H04W 4/021; H04W 84/20
See application file for complete search history.

(56) References Cited

U.S. PATENT DOCUMENTS 5,850,592 A * 12/1998 Ramanathan ......... H04W 52/36
455/7
8,700,060 B2     4/2014 Huang
(Continued)

FOREIGN PATENT DOCUMENTS

CN        113556286 A      10/2021
EP        0 869 373 A2     10/1998
(Continued)

OTHER PUBLICATIONS

Waqar et al., "Analysis of GPS and UWB positioning system for athlete tracking," Elsevier, Measurement: Sensors, vol. 14, No. 100036, 2021, Total 12 pages.
(Continued)

*Primary Examiner* — Cassi J Galt
(74) *Attorney, Agent, or Firm* — Sughrue Mion, PLLC

(57) ABSTRACT

Provided are a system and method of an advanced dynamic multi lead technology utilizing Ultra Wideband and other sensors to improve position accuracy and data sharing among devices. The system and method use a high calculation process to enhance the position and sharing technology, focusing on representative devices as lead devices. The remaining devices act passively to locate their coordinate positions using the lead devices as a reference and as a medium to share resources.

15 Claims, 31 Drawing Sheets

▲ Group Lead    ○ Non-Lead

Moving group of UWB devices

Position Enhancement method only in Leads

(56)    References Cited

U.S. PATENT DOCUMENTS

| | | | |
|---|---|---|---|
| 9,426,620 B2 | 8/2016 | Xu et al. | |
| 9,568,585 B2 * | 2/2017 | Smith ................... | H04W 4/027 |
| 10,289,695 B2 | 5/2019 | Wang | |
| 10,893,379 B2 | 1/2021 | Sheng et al. | |
| 11,501,402 B2 | 11/2022 | Zhu et al. | |
| 11,702,080 B2 | 7/2023 | Downing et al. | |
| 2003/0054838 A1 * | 3/2003 | Carrez ................. | G01S 5/0249 |
| | | | 455/450 |
| 2005/0001720 A1 | 1/2005 | Mason et al. | |
| 2006/0071780 A1 | 4/2006 | McFarland | |
| 2007/0005292 A1 | 1/2007 | Jin | |
| 2007/0040733 A1 | 2/2007 | Kaufmann | |
| 2011/0074569 A1 * | 3/2011 | Alsindi ................ | G01S 5/0289 |
| | | | 340/539.1 |
| 2012/0303556 A1 * | 11/2012 | Lin ..................... | G01S 5/02527 |
| | | | 706/12 |
| 2014/0155093 A1 * | 6/2014 | Teller ................... | H04W 4/021 |
| | | | 455/456.3 |
| 2015/0154543 A1 | 6/2015 | Skaaksrud | |
| 2015/0200706 A1 | 7/2015 | Bottazzi et al. | |
| 2017/0115376 A1 | 4/2017 | Kim et al. | |
| 2018/0024223 A1 | 1/2018 | Williams | |
| 2018/0115867 A1 | 4/2018 | Cho et al. | |
| 2018/0206099 A1 | 7/2018 | O' Connor et al. | |
| 2018/0336224 A1 | 11/2018 | Ioup et al. | |
| 2018/0356492 A1 | 12/2018 | Hamilton | |
| 2020/0145808 A1 | 5/2020 | O'Connor et al. | |
| 2020/0252742 A1 | 8/2020 | Yeon et al. | |
| 2021/0325504 A1 | 10/2021 | Palatov et al. | |

FOREIGN PATENT DOCUMENTS

| | | |
|---|---|---|
| JP | 2021-47895 A | 3/2021 |
| JP | 2021-510882 A | 4/2021 |
| KR | 10-1343174 B1 | 12/2013 |
| KR | 10-2019-0038034 A | 4/2019 |
| WO | 2021/023377 A1 | 2/2021 |
| WO | 2021/171102 A1 | 9/2021 |

OTHER PUBLICATIONS

Vojdani et al., "Localization in Anchor less Wireless sensor Network," Proceedings of 2009 International Conference on Computer Engineering and Applications, Jun. 6-8, 2009, Total 5 pages.

Cao et al., Accurate position tracking with a single UWB anchor,' arXiv:2005.10648v1 [cs.RO], May 2020, Total 8 pages.

Jiang et al., "Integrated UWB and GPS Location Sensing System in Hospital Environment," 2010 5th IEEE Conference on Industrial Electronics and Applications, pp. 286-289, 2010.

International Search Report (PCT/ISA/210) and Written Opinion (PCT/ISA/237) dated Jan. 9, 2023 issued by the International Searching Authority in International Application No. PCT/KR2022/014250.

Yang, Q., et al., "Cooperative 3-D relative localization for UAV swarmby fusing UWB with IMU and GPS", Journal of Physics: Conference Series, vol. 1642, Sep. 30, 2020, pp. 1-11 (12 pages).

Lee, Y., et al., "Vision/UWB/IMU sensor fusion based localization using an extended Kalman filter", 2019 IEEE Eurasia Conference on IOT, Communication and Engineering, Dec. 27, 2019, pp. 401-403 (4 pages).

Xianjia, Y., et al., "Cooperative UWB-Based Localization for Outdoors Positioning and Navigation of UAVs aided by Ground Robots", arXiv:2104.00302v1 [cs.RO], Apr. 1, 2021, 6 pages.

Communication issued Feb. 17, 2025 by the European Patent Office for EP Patent Application No. 22911520.9.

Li et al., "A Clustering Algorithm Based on K-means for Wireless Indoor Monitoring System", 2009 International Conference on Information Technology and Computer Science, 2009, pp. 488-492, XP031499818, doi:10.1109/ITCS.2009.299.

Alsalman et al., "A Balanced Routing Protocol Based on Machine Learning for Underwater Sensor Networks", IEEE Access, Nov. 8, 2021, pp. 152082-152097, XP011888630, doi:10.1109/Access.2021.3126107.

Chen et al., "Three-Dimensional Localization of RF Emitters: A Semantic Segmentation-based Image Processing Approach", 2020 IEEE/CIC International Conference on Communications in China (ICCC), Aug. 9, 2020, pp. 806-810, XP033853362, doi:10.1109/ICCC49849.2020.9238972.

Communication dated Jul. 14, 2025, issued by European Patent Office in European Patent Application No. 22911520.9.

* cited by examiner (a)                    (b)

FIG. 20

$$x_{FUSED} = \frac{\sum_{i=1}^{n} \frac{x_i}{V(S_i)}}{\sum_{i=1}^{n} \frac{1}{V(S_i)}}$$
To get Fused Value $$V(S_{FUSED}) = \frac{1}{\sum_{i=1}^{n} \frac{1}{V(S_i)}},$$
To get Fused variance With $x_i$ = Measurement of Sensor i $V(S_i)$ = Variance of Sensor i

INTELLIGENT DYNAMIC MULTI LEAD MECHANISM WITH ANCHOR-LESS ULTRA WIDEBAND

CROSS-REFERENCE TO RELATED APPLICATIONS

This application is a continuation application of International Application No. PCT/KR2022/014250, filed on Sep. 23, 2022, in the Korean Intellectual Property Office, which is based on and claims priority from Indonesian Patent Application No. P00202111994, which was filed on Dec. 23, 2021, in the Indonesian Patent Office, the contents of each of which are herein incorporated by reference in their entireties.

BACKGROUND

1. Field

The disclosure relates to a system and method to utilize Ultra Wideband (UWB) and other sensors to improve position accuracy and data sharing using a dynamic multi-lead technology.

2. Description of Related Art

A tracking system generally utilizes location data which is gathered, processed and stored and which then can be used for various purposes. A tracking system may be used, for example, to track people or items, and also to perform clustering and matching.

A location of a target is usually tracked from time to time using, for example, Global Positioning System (GPS) location data or Ultra Wideband (UWB) location data of an object combined with the GPS location data of the device.

SUMMARY

In accordance with an aspect of the disclosure, a method may comprise performing Geohash-based geofencing to define a geohash area; selecting one or more devices among a plurality of devices in the geohash area as a lead device, based on a plurality of measured parameters of each of the plurality of devices and based on a weight calculation performed on the plurality of measured parameters; determining a positon of the lead device based on a decentralized consensus between a local filter and a global filter; locating a position of each non-lead device among the plurality of devices in the geohash area, by using the lead device as a virtual anchor to calculate a position of each non-lead; sharing a position and resources among the plurality of devices by centralizing all traffic data to the lead device, the lead device forwarding data to a network or to other devices among the plurality of devices; and updating the plurality of measured parameters and reselecting one or more devices among the plurality of devices in the geohash area as the lead device, based on the updated measured parameters.

In accordance with another aspect of the disclosure, a system may comprise a plurality of devices, each device comprising a global positioning system (GPS) sensor, an inertial movement unit (IMU) sensor, and an ultra wide band (UWB) sensor, wherein a first portion of the plurality of devices have network access and a second portion of the plurality of devices have no network access, and wherein each device of the first portion obtains its position based on location data from its own GPS sensor; and wherein devices of the second portion obtain their position based on location data obtained from devices of the first portion as virtual anchors through UWB communication with the devices of the first portion.

In accordance with yet another aspect of the disclosure, a system for calculating position coordinates of a plurality of devices and enabling resource sharing between the plurality of devices using a dynamic multi-lead technology may comprise a geohashing server module that is configured to encode geographic coordinates into digits and letters of a geographic area by dividing a geographic area into a plurality of grids and successively dividing each of the plurality of grids to create a new grid cluster until a diagonal distance of a divided grid is equal to a maximum distance of an ultra-wide band (UWB) sensor; a lead selection module that is configured to select, in a lead selection, one or more devices of the plurality of devices within a geohash area corresponding to the divided grid as a lead device, by employing pre-defined parameters and a weight calculation; a lead position enhancement module that is configured to enhance a lead position of each lead device to obtain better accuracy by combining a self-perspective position measurement in a local filter and a neighbor-perspective position measurement in a global filter, the self-perspective position measurement and the neighbor-perspective position measurement continuously correcting each other's measurements to obtain position accuracy; a non-lead position calculation module configured to locate a non-lead position of each non-lead device of the plurality of devices by using the lead device as a virtual anchor and by using a tetrahedron calculation to calculate the non-lead position; a position and area resource sharing module that is configured to enable sharing a position and resources between devices of the plurality of devices by centralizing traffic data to a nearest lead device such that the data is forwarded to the Internet or to other devices of the plurality of devices; and a parameters update module that is configured to update the pre-defined parameters and a threshold parameter in the system in order to recalculate the lead selection.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 20 is an example of calculating sensor fusion using confidence-weighted averaging, according to an embodiment;

DETAILED DESCRIPTION

Figure 1:
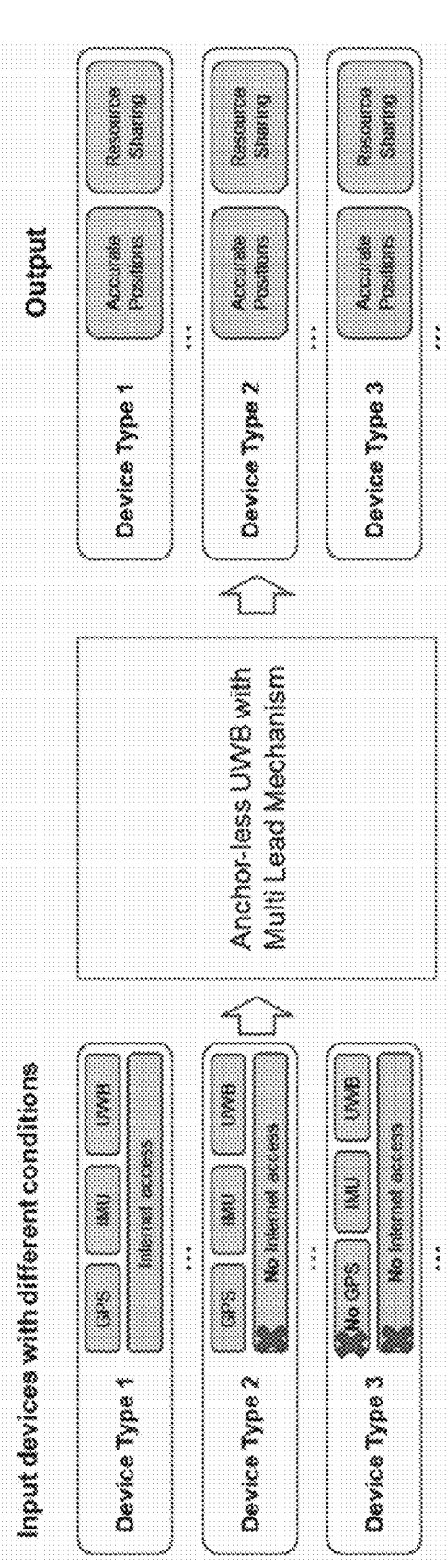
FIG. 1 is a conceptual diagram illustrating input and output of an Anchor-less UWB with Multi Lead Technology, according to an embodiment.

A system and method use Ultra Wideband (UWB) and other sensors to improve position accuracy and data sharing using a dynamic multi-lead technology. The system and method primarily use UWB, and do not require all devices to have active internet connection to share location data and other resources.

A tracking system generally use location data sent from a device to a collector and processor, which could be in the form of a device or a server. The data are gathered, processed and stored which then can be used for various purposes. As discussed above, a tracking system may be used, for example, for tracking people or items, and also for clustering and matching.

When tracking people or an item, the location of the target is usually tracked from time to time. For example, a Global Positioning System (GPS) tracker which uses GPS location data may be used. As another example, an Ultra Wideband (UWB) tracker which uses UWB location data of an object combined with the GPS location data of the device that accepts target notification may be used. The main difference is the GPS tracker device actively notifies its location, while the UWB tracker relies on other nearby devices to notify its location. Clustering and matching use location data and some other metadata to cluster or match an object being tracked to trigger an action. An example of clustering and matching is when there is an item being carried outside a premises then an alarm can be triggered.

Many tracking systems use server-based or beacon-based approaches. A server-based approach requires information to be sent to a server for preparation, storing and processing. This approach is often used in GPS, in which the location data are provided by sensors. The data is then redistributed to a user in the form of visualization. However, the approach requires an active internet connection to send data to the server since all data is processed on the server. This approach causes a security risk, since all data from the user are sent to the server. The location itself depends on the accuracy of the sensor which is used to generate location data.

In a Beacon-based system, a beacon can transmit a signal that will be received by approaching objects and acts accordingly based on a pre-set scenario. The beacon may act as a transmitter and the approaching object may be one that processes the information and acts accordingly, such as displaying information to the user. This approach has limited applications due to low processing power, and this approach is fixed on only a certain location since the approach needs a beacon to be functional. However, this technology may not need an active internet connection and the location accuracy does not depend on the active internet connection since the location accuracy is based on the beacon position.

A GPS tracker may be equipped with an Altimeter to measure an altitude or a height position above sea level. The information of the altitude can be obtained and sent to the server since the GPS tracker will actively notify the server regarding the location, as well as other data from the altimeter. An UWB Tracker can pinpoint a location of a target device within a two-dimensional (2D) scope. However, the UWB Tracker cannot determine an altitude of a target object since the target device is rarely equipped with another device that can produce altitude data.

There are various methods for object detection, map reconstruction, route guiding and so on. However, none of the various methods leverage all aspects into an intelligent system that use a multi-lead method to improve position accuracy and resource sharing with UWB.

There is a method that adjusts a clock to synchronize from a UWB slave reader until a main UWB receives a sequence from each UWB pulse. Each pulse has a predetermined pulse period and encodes a master UWB reader unique identifier at an expected time slot.

There are methods that use Static UWB anchors. For example, a location sensing system in a hospital environment may provide real-time, mobile and seamless indoor/outdoor location tracking for medical staff, patients or instruments in hospital environment, by integrating GPS with Static UWB Anchors to get indoor and outdoor locations. As another example, there is a similar UWB-based localization technique for wearable sports performance monitoring systems that uses a Static UWB anchor to get a 2D and 3D position. In another example, a method uses a set of pre-existing anchors with less GPS receivers. Another approach uses a single UWB anchor and continuously monitors UWB range changes to estimate a robot speed when moving on a line by combining speed estimation with orientation estimation from an Inertial Movement Unit (IMU) sensor and to estimate the pose of a robot using an Extended Kalman Filter (EKF).

However, a dynamic anchorless system according to some embodiments combines IMU position calculation with GPS, and a Prediction of Inner Model and Neighbors Consensus Calculation to get a position. A dynamic anchorless system according to some embodiments uses a multi-lead technology by combining an IMU position calculation of multiple devices with GPS, and a Prediction of Inner Model and their Neighbors. A dynamic anchorless system according to some embodiments uses performs calculations by combining pre-defined leads or representative devices. It is an aspect to provide a dynamic anchorless system with a multi-lead technology by combining an IMU position calculation of multiple devices with GPS and a Prediction of Inner Model and their Neighbors to get a better position.

A novel method according to various embodiments provides a more accurate anchorless 3D position using UWB to perform tracking, clustering and matching, and resource sharing.

According to some embodiments, a new system and method use UWB and other sensors to improve position accuracy and resource sharing using a dynamic multi-lead technology. By using this technology, the high calculation load process (i.e., a process that requires high calculation load/power) to enhance the position and sharing technology is only focused on a representative device (lead) and remaining devices (non-lead) will act passively. The non-leads are set to have the capability of locating the coordinate position with leads as the references and share their resources through leads. As used herein the term "lead" may refer to lead device(s) and the term "non-lead" may refer to non-lead device(s).

A system according to some embodiments may perform several functions. For example, the system according to some embodiments may perform a tracking and tracing function which allows users to track and trace the movement of an object that is equipped with UWB, IMU and GPS sensors better. Thus, the system according to some embodiments may perform three-dimensional positioning with minimum internet access or even without internet access for non-leads. The system according to some embodiments may perform a clustering and matching function which allows users to cluster and match an object equipped with UWB, IMU and GPS sensors. Thus, the system according to some embodiments may provide better matches between devices or users by providing better routes in three-dimensional scope. The system according to some embodiments may perform an area data sharing function which allows users to share their data in an area without internet access and without being limited by the maximum distance from UWB sensors. All data may be sent through the leads and the lead may forward the data to other devices. The system according to some embodiments may help for managing group sharing because all data is centered into the lead.

The system according to some embodiments may include several modules. The system according to some embodiments may include a Geohashing Server module. In some embodiments, the Geohashing Server module may be implemented by one or more processors on a Geohashing server. The processor may be, for example, a central processing unit (CPU), a microprocessor, a microcontroller, or hardware control logic coded to perform the function of the Geohashing Server module. The purpose of the Geohashing Server module is to simplify the calculation process and address various limitations of UWB in terms of distance. The system according to some embodiments may limit an area of calculation to a size of a diagonal distance that is equal to a max distance of UWB. This process may be processed on a server and each device may get geohashing information in the first time. The system according to some embodiments may include a Lead Selection module. In some embodiments, the Lead Selection module may be implemented by one or more processors on one or more devices within the system. The processor may be, for example, a central processing unit (CPU), a microprocessor, a microcontroller, or hardware control logic in the one or more devices that is coded to perform the function of the Lead Selection module. This module may focus on finding representative devices or leads using a weight technology. The system according to some embodiments may determine the leads using weight calculation by considering parameters of users' density in the area, the position of the device, device characteristics, and device states. In some embodiments, the weight calculation may automatically update depending on the state of parameters. The system according to some embodiments may include a Lead Position Enhancement module. In some embodiments, the Position Enhancement module may be implemented by one or more processors on one or more devices within the system. The processor may be, for example, a central processing unit (CPU), a microprocessor, a microcontroller, or hardware control logic in the one or more devices that is coded to perform the function of the Lead Position Enhancement module. This module may enhance the position of all leads when a user or device is determined as a lead. The system according to some embodiments may use a decentralized consensus method that combines measurements between the device and neighbors. The system according to some embodiments may include a Non-Lead Position Calculation module. In some embodiments, the Lead Position Calculation module may be implemented by one or more processors on one or more devices within the system. The processor may be, for example, a central processing unit (CPU), a microprocessor, a microcontroller, or hardware control logic in the one or more devices that is coded to perform the function of the Lead Position Calculation module. After getting the enhanced position of all leads, a non-lead may locate the position through all leads as a virtual anchor. The system according to some embodiments may include a Positions and Area Resource Sharing module. In some embodiments, the Positions and Area Resource Sharing module may be implemented by one or more processors on one or more devices within the system. The processor may be, for example, a central processing unit (CPU), a microprocessor, a microcontroller, or hardware control logic in the one or more devices that is coded to perform the function of the Positions and Area Resource Sharing module. In this module, positions and resources may be shared through the multi-lead technology and also may be forwarded to the server via leads. The system according to some embodiments may include a Parameters Update module. In some embodiments, the Parameters Update module may be implemented by one or more processors on one or more devices within the system. The processor may be, for example, a central processing unit (CPU), a microprocessor, a microcontroller, or hardware control logic in the one or more devices that is coded to perform the function of the Parameters Update module. Devices may update their parameters and when the parameters have reached a threshold, the system may be rolled back to the first step to determine a new lead.

The system according to some embodiments may provide several features that improve over the related art. The system according to some embodiments may divide the area into a smallest grid cluster, by using a Geohashing method to encode geographic coordinates and divide the area into several grids and/or limiting the area of calculation to a size of a diagonal distance that is equal to a maximum distance of UWB sensors.

The system according to some embodiments may determine the leads and non-leads, by finding representative devices (lead) within a geohash area using predefined parameters and a weight calculation, measuring information related to each device, such as distance, silhouette value, a device's behavior and/or a state of the device to calculate the weight of every device, enhancing the accuracy of all leads by combining several measurements to get a better position accuracy using any sensor fusion algorithm, such as a Kalman Filter, a Bayesian network, a Convolutional Neural Network (CNN) and so on, calculating the position of non-leads using the leads as a virtual anchor and using a trilateration calculation, and/or promoting several non-leads as sub-leads to behave as a reference point or a virtual anchor in a case when a device is in the geohash area but is not detected by the leads.

The system according to some embodiments may enable position and resource sharing, by centralizing all information to the nearest lead, and measuring the position of non-leads by sharing their current position with the leads, and/or providing manageable and accessible information between lead and non-lead since all information may be forwarded by the lead to other resources.

Various embodiments will be described with reference to FIGS. 1 through 31. Accordingly, it is to be understood that the embodiments herein described are merely illustrative of the application. Reference herein to details of the illustrated embodiments is not intended to limit the scope of the claims.

Referring now to FIG. 1, FIG. 1 describes an overview of inputs and outputs of an Anchor-less UWB with Multi lead Technology, hereinafter will be referred as Multi Lead Technology, in accordance with some embodiments. As described in FIG. 1, the is to introduce an anchor-less UWB technology to enhance positions and resource sharing between devices. This configuration allows all devices that are minimally equipped with UWB and IMU sensors to continuously receive coordinate position and share resources when there is no access to GPS and no Internet access.

Figure 2:
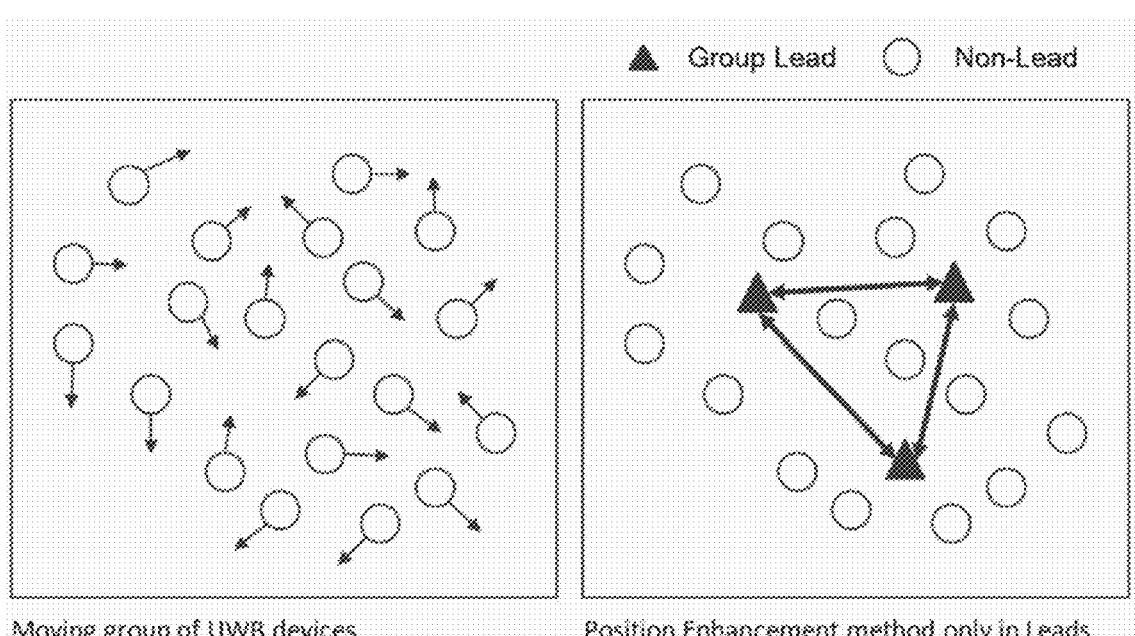
FIG. 2 is the illustration of multi-lead technology showing a group lead and a non-lead, according to an embodiment.

Referring now to FIG. 2, FIG. 2 describes a multi lead technology in a moving group of UWB devices, according to an embodiment. The system according to some embodiments may provide a UWB Real-Time Location System on a moving group. To get the absolute position of the group, a position enhancement system may use GPS, an Inertial Movement/Measurement Unit (IMU) and Inner model prediction. To use this system, devices may automatically communicate with each other and choose a representative device, hereinafter will be referred as a lead, to calculate the absolute position using the position enhancement module and act as a virtual anchor. The remaining devices, hereinafter will be referred as a non-lead, may indirectly act passively and preserve energy as the non-lead is only used to locate the position with virtual anchors as the references. This embodiment can also be applied for resource sharing.

Figure 3:
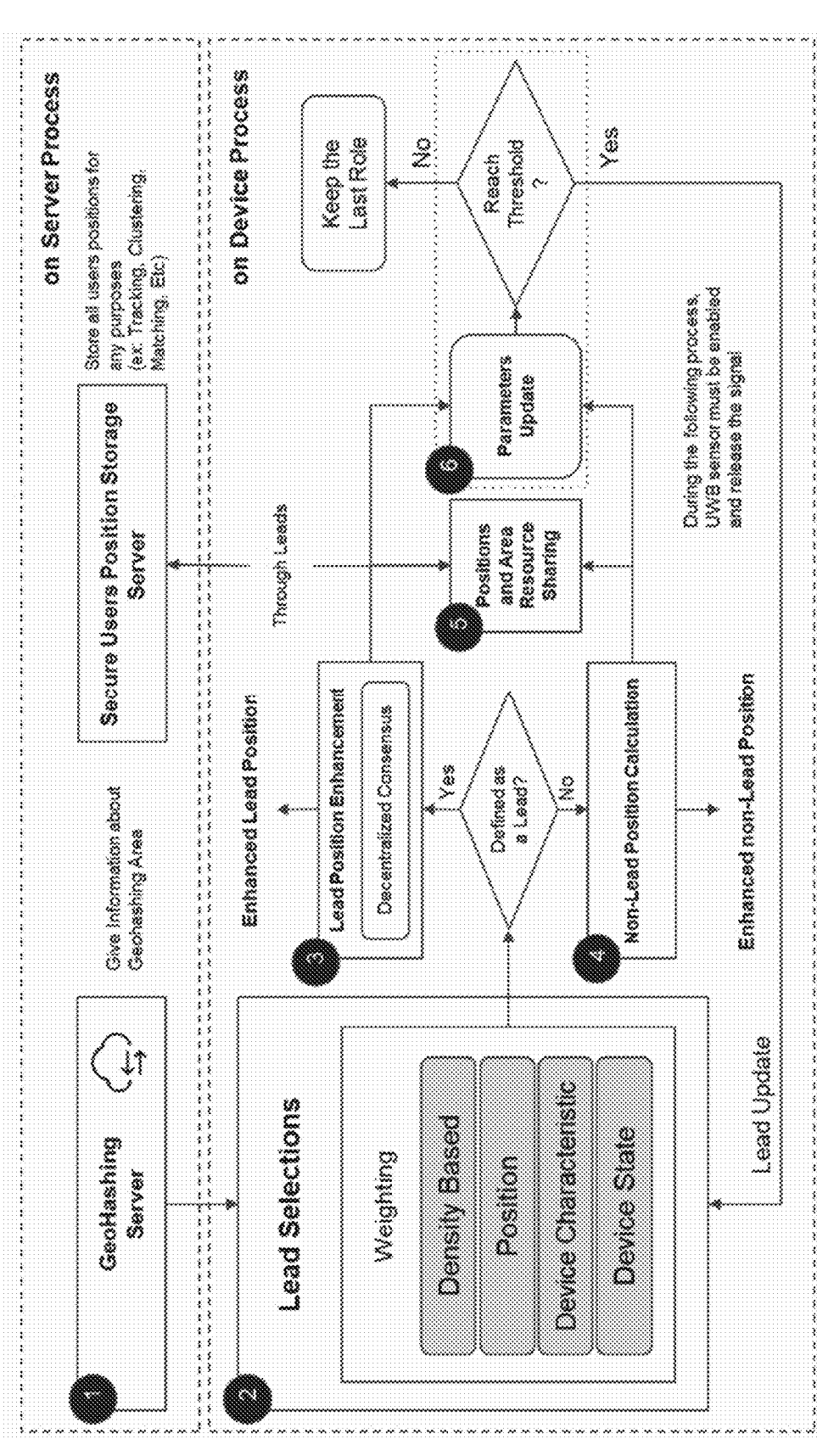
FIG. 3 is an overview of Anchor-less UWB with Multi Lead Technology, according to an embodiment.

Referring now to FIG. 3, FIG. 3 describes an overview of Multi Lead Technology, according to an embodiment. The system focuses on how to determine the leads and how to enhance the position accuracy or resource sharing. The system according to some embodiments may include several modules. The Geohashing Server module may simplify the calculation process and to set limitations to the distance of UWB to only a size of a diagonal distance that is equal to the maximum distance of UWB sensors. The process may take place on a server, and each device may initially acquire geohashing information. The Lead Selections module may find the representative devices or leads using weightings. The system may determine the leads using weight calculation by considering parameters of users' density in the area, the position of the device, device characteristic(s), and device state(s). The weights may be automatically updated depending on the state of the parameters. In some embodiments, the weights may be automatically updated depending on the state of all parameters. The Lead Position Enhancement module may enhance the position of selected leads using a decentralized consensus method by combining measurements between the device and neighbors. In some embodiments, all measurements between the device and all neighbors may be combined. The Non-Lead Position Calculation module may locate the position of non-leads through leads whose position has been enhanced as virtual anchor. In some embodiments, the position of non-leads may be located through all leads whose position has been enhanced as virtual anchors. The Positions and Area Resource Sharing may enable sharing through the multi-lead technology and also may be forwarded to the server via leads. The Parameters Update module may update the parameters of devices and the system may roll back devices to the first step to determine new leads if the parameters have reached the threshold. In some embodiments, the parameters of all devices may be updated, and the system may roll back all devices to the first step to determine new leads when parameters have reached the threshold.

TABLE 1

| Tracking & Tracing | Clustering And Matching | Data Resource Sharing |
|---|---|---|
| Track And Trace User Position. | Gives Recommendation Of Other | Send Data Resource To Other |
| Device Condition Type: | User's Existence Based On Same | Group Member(S). |
| With/Out Internet | Preference. | Data Resource Example: |
| With/Out GPS | Recommendation Examples | Message |
| Different Height Level | Find Friend Or | Image |

TABLE 1-continued

| Tracking & Tracing | Clustering And Matching | Data Resource Sharing |
|---|---|---|
| Position<br>Dynamic Position | Colleagues Group in<br>Emergency Situation.<br>Find User With Same<br>Preference Or Interest | Maps |

Referring now to table 1, table 1 describes various embodiments may be applied to various use cases when a user uses any UWB device such as a smartphone, a smart tracker, a smartwatch or any device that supports UWB. There are several use case scenarios for Multi Lead Technology that may be applied with or without an internet connection in various range area. Tracking & Tracing, Clustering & Matching, and Data Resource Sharing may be applied. Each of the Tracking & Tracing function, the Clustering & Matching function, and the Data Resource Sharing function may be applied to the following use cases.

Figure 4:
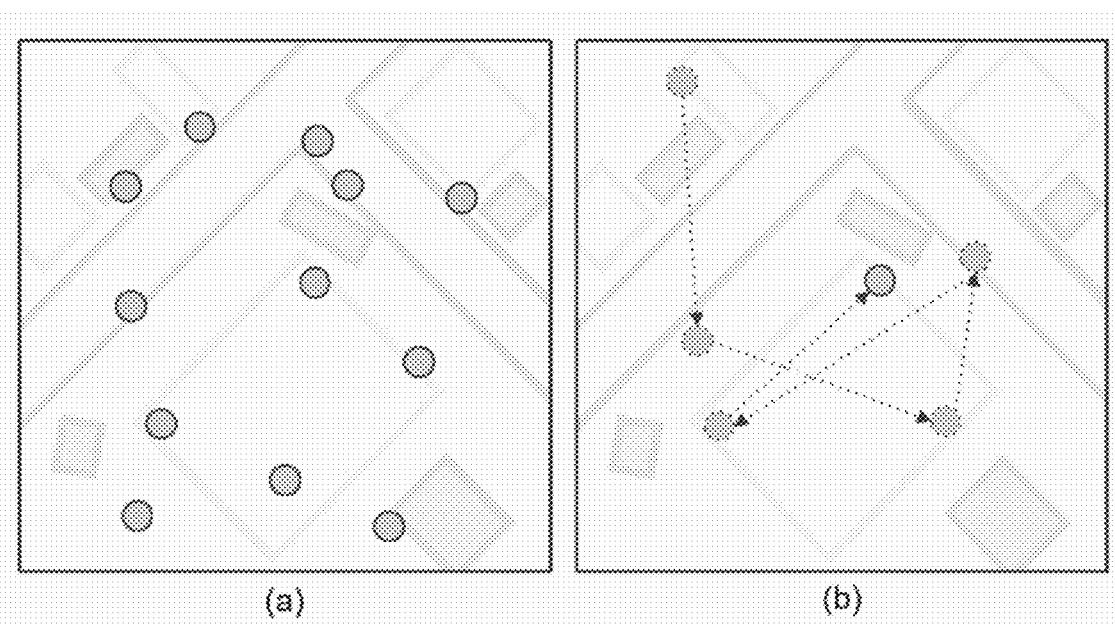
FIG. 4 is the illustration of tracking and tracing capabilities where each node represents position and time of devices, where (a) and (b) illustrate a history of a device, according to an embodiment.

Referring now to FIG. 4, FIG. 4 describes a simulation of a Tracking & Tracing feature of the Multi Lead Technology, according to an embodiment. Tracking and tracing may be used for activities that relate to a group of people. By using the Multi Lead Technology, users can track and trace devices in dynamic range and even in three-dimensional positioning. A cloud server may be used to receive a device's position data. With the device's accuracy of the device's position, the system can save the location history for users to access the data and conduct tracing activity. Therefore, data processing may be performed even when an internet connection is low, and the non-leads may perform data processing without an internet connection. FIG. 4 illustrates a use case for a Tracking & Tracing feature of the Multi Lead Technology, where (a) shows the devices positions after each device sends its data into cloud, and (b) shows a device tracing capability, based on an input of device movement history.

Figure 5:
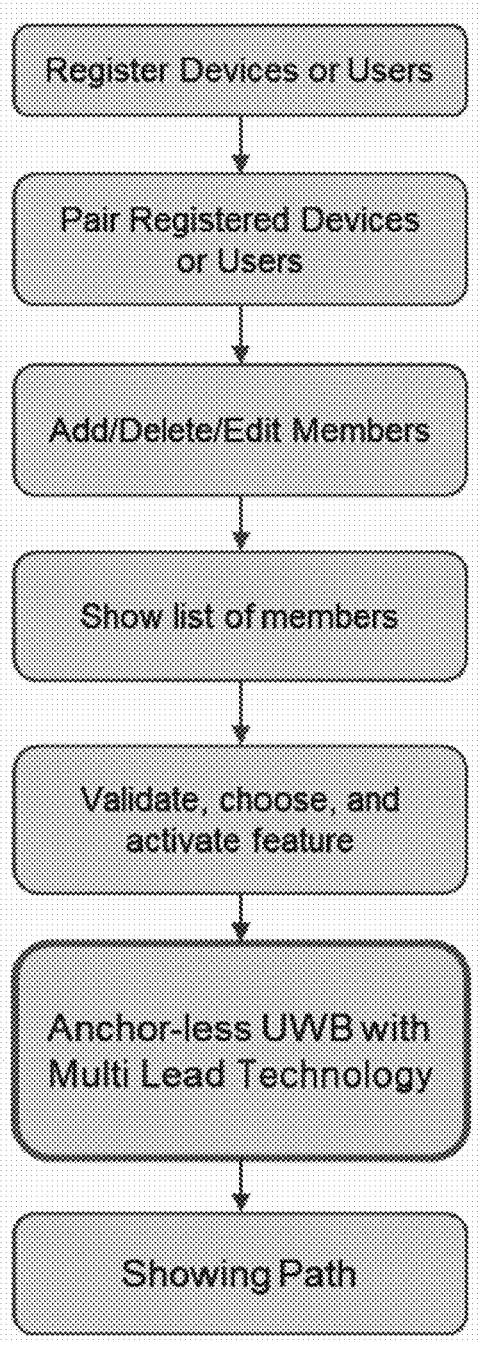
FIG. 5 is the process flow of a tracking and tracing method, according to an embodiment.

Referring now to FIG. 5, FIG. 5 is a flow of a process when using a tracking and tracing method of the system, according to an embodiment. A user may registers devices or users to be tracked and traced and the system may pair registered devices and users. In some embodiments, a user may register all devices to be tracked and traced and the system may pair all registered devices and users. User can add, delete, and edit the list of members of the pairs. The system may show a list of paired devices and users, and show the detail preference for each devices and user. After showing a recommendation, user may choose, validate, and activate the Tracking & Tracing feature. All the information may be feed to the system to process and produce coordinates as the output. Upon feature activation, the system may show the path that to guide users to reach a destination.

Figure 6:
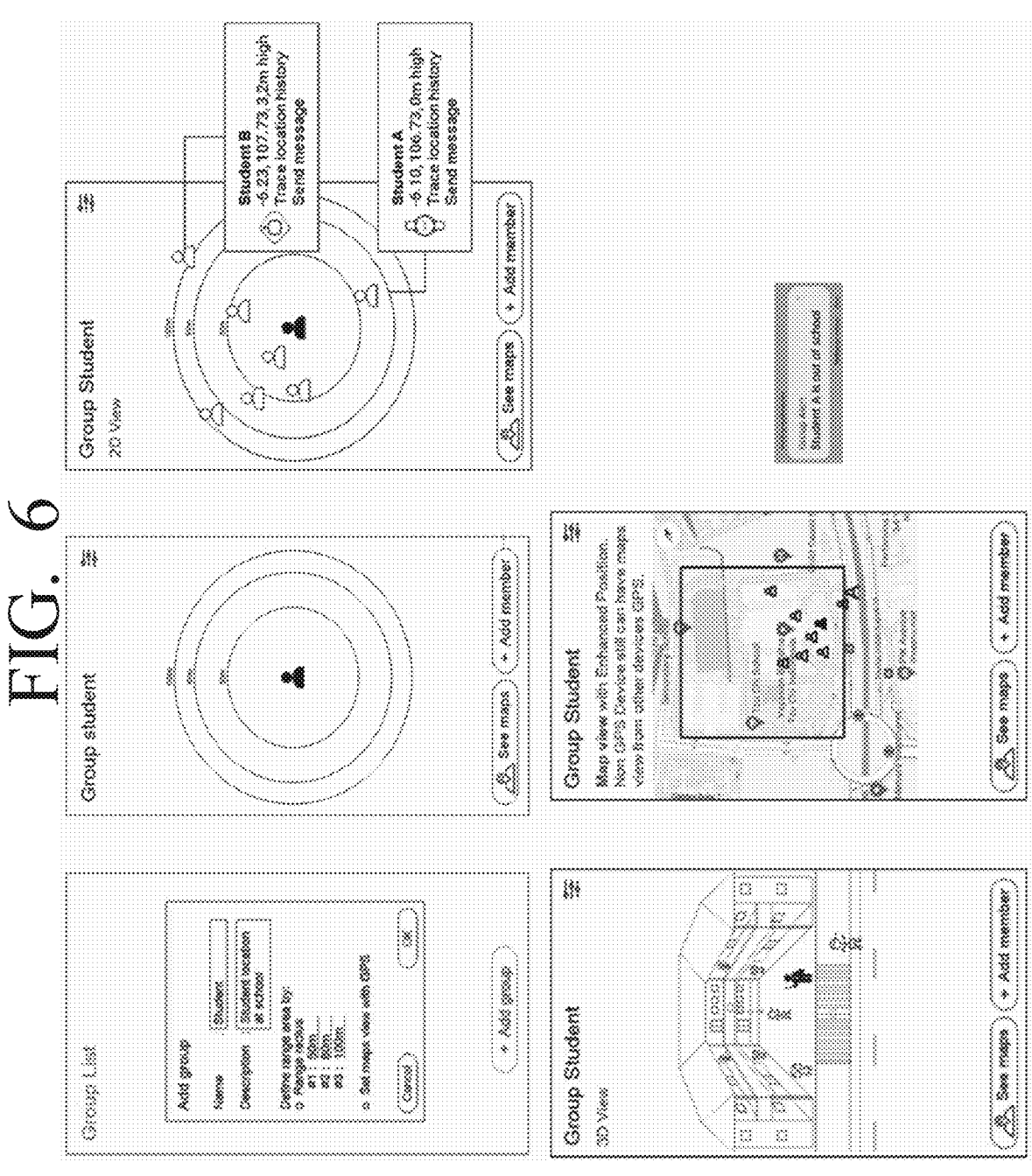
FIG. 6 is a sample use case scenario of a teacher tracking a location of students using the multi lead technology, according to an embodiment.

Referring now to FIG. 6, FIG. 6 illustrates a use case scenario for the Tracking & Tracing feature used by a school teacher to track students' whereabouts. Teachers often need to know the whereabouts of the students for the safety of the children at school, for example whether the students are still in the classroom or school area, or outside the school area. It is easier when the students are in the same room with the teacher, but it is difficult to see if the students are in a different classroom, or obstructed by parts of the classroom building, such as walls or school fences. With the system according to some embodiments, the teacher may track the students by using the dynamic multi lead technology on a smartphone, and connect with students using a smartphone, a smartwatch or a smart tracker. Teachers can find out visually in real time and accurately where their students are, and may get notification alerts if students are outside the set range area. Teachers can know the position and movement of their students, so they can take the necessary actions to find or tell their students to return to the range of the classroom or school area. FIG. 6 shows a user flow of using Multi Lead Technology to track accurate location of the students. First, the teacher can specify an entityID by adding a group named as "Student", and set a dynamic area range and maps of school area. The teacher can add a member of "Student" group by adding students' UWB devices. When a device tagged to one of the children is out of the specified range, the teacher may receive a notification and the system may show real-time tracking and tracing visualization of the student.

Figure 7:
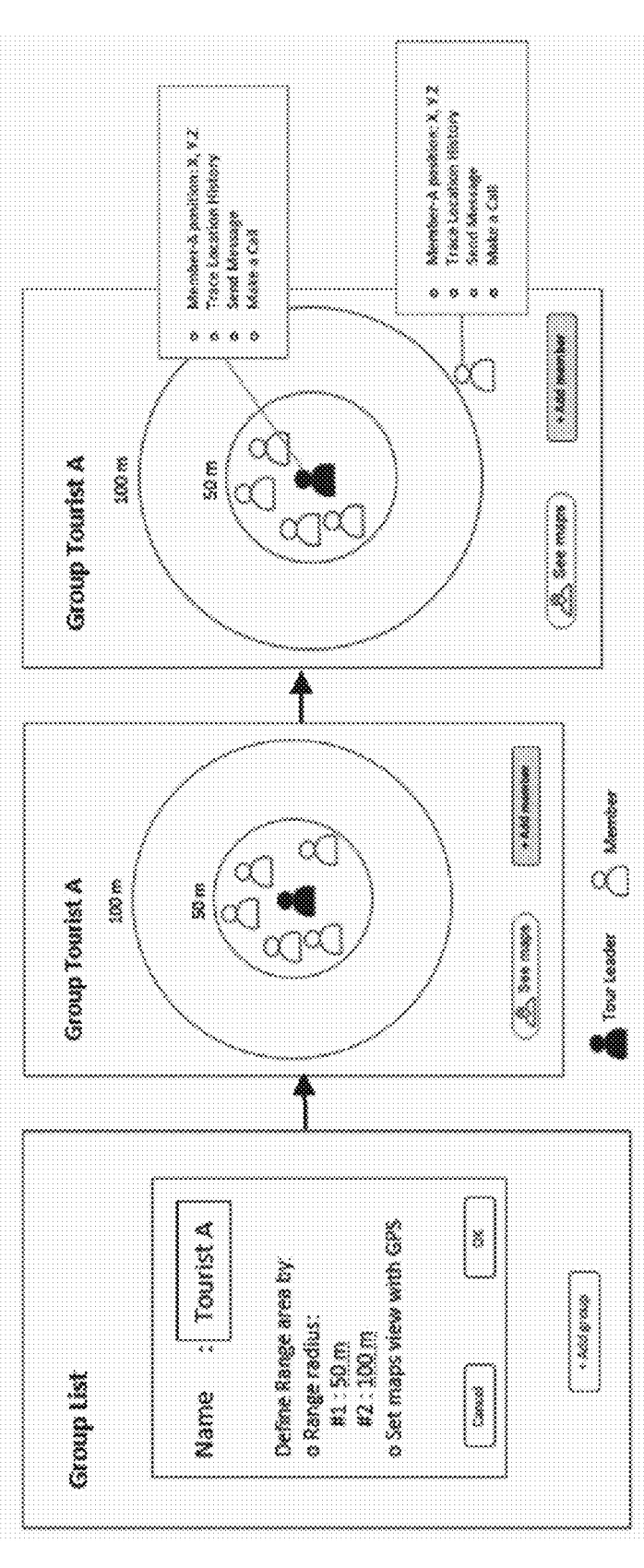
FIG. 7 is a sample use case scenario of using multi lead technology for dynamic tracking and tracing to show the position of leads and non leads in a tour group, according to an embodiment.

Referring now to FIG. 7, FIG. 7 illustrates a use case scenario for the Tracking & Tracing feature used by a tour leader to manage the group of tourists. Members of a tourist group need to remain in one group when traveling, especially in a foreign, newly visited place. However, there are conditions where members of the group can be accidentally separated or intentionally separated for purposes, such as going to the restroom, that makes members separated from the group. Making calls or sending a message to one of the group members is the usual way to find out the location of the group again. However, it can be difficult to do so in some situations where no internet network is available, such as when landing at an international airport, or the phone is in airplane mode. Using the system according to an embodiment, the Tour Leader may receive a notification when a member of his/her group is separated from the group without using an internet connection. The separated member may also receive a notification that he/she is separated from the group, and may find out the location of the group and accurately know the position of the Tour Leader, making it easier to return with the group. The group leader may also know the movement of the group members, thus helping so that no member of the group is left behind and separated from the group. As shown in FIG. 7, the flow of using the Tracking & Tracing feature in this use case starts with the tour leader specifying an entityID by adding a group called as "Tourist" and setting a dynamic area range and maps of group area. The tour leader can add members to the "Tourist" group by registering the tour members' devices in order for the system to visually show the initial position of all group members on all devices. Any movement of the member can be traced in real time, and if there is a member out of the specified range, Tour Leader and the separated member may get a notification. The system will show the real-time position of the Tour Leader accurately, and the Tour Leader can track and trace the member visually using the system.

Figure 8:
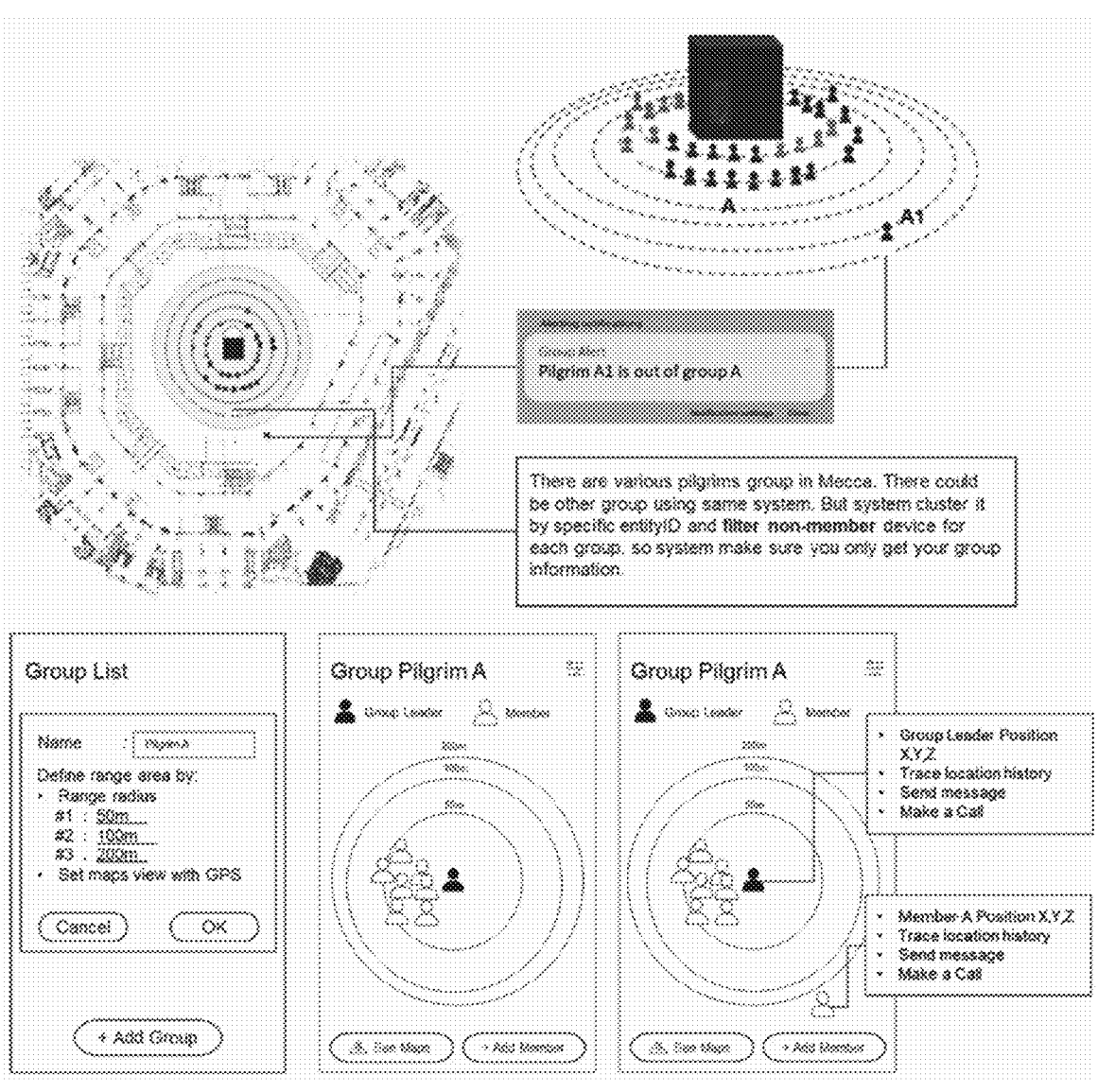
FIG. 8 is a sample use case scenario of using multi lead technology for dynamic tracking and tracing of group movement in a pilgrim group, according to an embodiment.

Referring now to FIG. 8, FIG. 8 illustrates a use case scenario for Tracking & Tracing feature for a member to track and trace the whereabouts of the group, according to an embodiment. There are usually many different groups from various countries performing Pilgrim Hajj. Some of the worship activities involve moving around the Kaaba several times. The different walking speed of each person in a group can cause the members to separate from the group. Likewise, if members of the group have a need, such as going to the restroom, or want to take ablution water, the members will be separated from the group which continues to move dynamically. It will be quite difficult for the member to be able to return to the group since many other groups are also moving. With the system according to some embodiments, members can see the accurate position and movement of the group, and will also be notified when the members are out of reach of the group's specified area. Even though there are many groups that move dynamically, with the system according to some embodiments, group members can dynamically track and trace the movement of their own group visually, and accurately know the position of the pilgrim leader and other members. FIG. 8 illustrates the flow of using the Tracking & Tracing feature in this use case. The flows starts with the pilgrim leader specifying an entityID by adding a group called as "Pilgrim" and setting a dynamic area range and maps of a pilgrimage area. The Pilgrim leader can add members to the "Pilgrim" group by registering the members' devices. Any movement of the member can be traced in real time, and if there is a member out of the specified range, Pilgrim Leader and the separated member will get a notification. The system will show the real-time position of the Pilgrim Leader accurately, and the Pilgrim Leader can track and trace the members' movement visually on the system.

Figure 9:
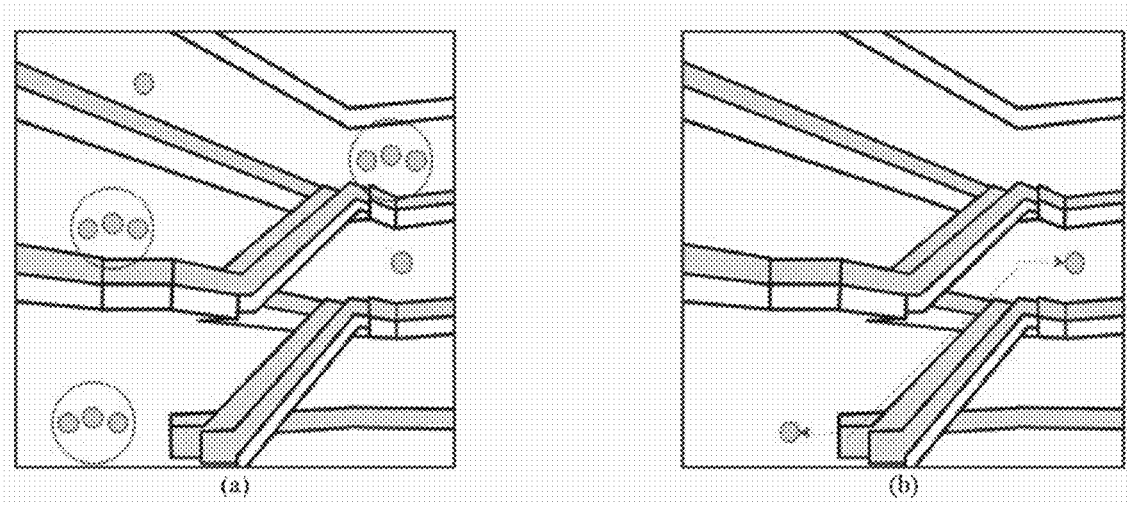
FIG. 9 is an illustration of clustering and matching systems to simulate a clustering process, where (a) and (b) illustrate a guidance path to other nodes, according to an embodiment.

Referring now to FIG. 9, FIG. 9 illustrates a simulation of a Clustering & Matching feature of the Multi Lead Technology system, according to an embodiment. Given the node information inside the grid in a Geohash area, the system may create a sub-cluster. The process starts with sensing the devices' position so that the system knows the devices' location. The next process is calculating a distance for each device/node to create a sub-cluster with at least 3 devices. FIG. 9 in (a) shows the result of the clustering information given the range/grid of Geohashing. Another feature of this system is matching, to match the same predefined interest preference into one cluster or group in dynamic range area and giving path recommendation directly to each other. With the system according to some embodiments, both clustering and matching can be performed better as the system may also perform clustering and matching in three-dimensional space.

Figure 10:
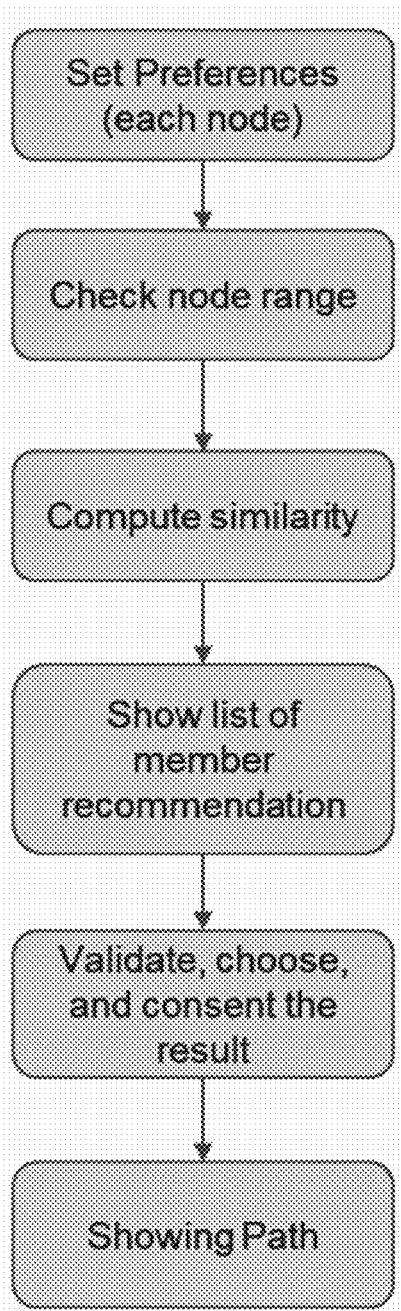
FIG. 10 is a process flow of a clustering and matching method, according to an embodiment.

Referring now to FIG. 10, FIG. 10 is an illustration of the flow of process for Clustering & Matching method, according to an embodiment. The system starts with setting preferences for each node to create a map between the nodes. The device may scan through and check whether there is another node within the range. After getting the node preference, the system may compute a similarity to a map and create a cluster if the nodes are close enough to be a cluster. In the point of view of a node, the system may show other devices as recommendations and may show the detail preference for each device. After showing the recommendations, a user may choose, validate and give consent to the result. After the validation of recommendation, the path may be shown to guide the user to reach the destination.

Figure 11:
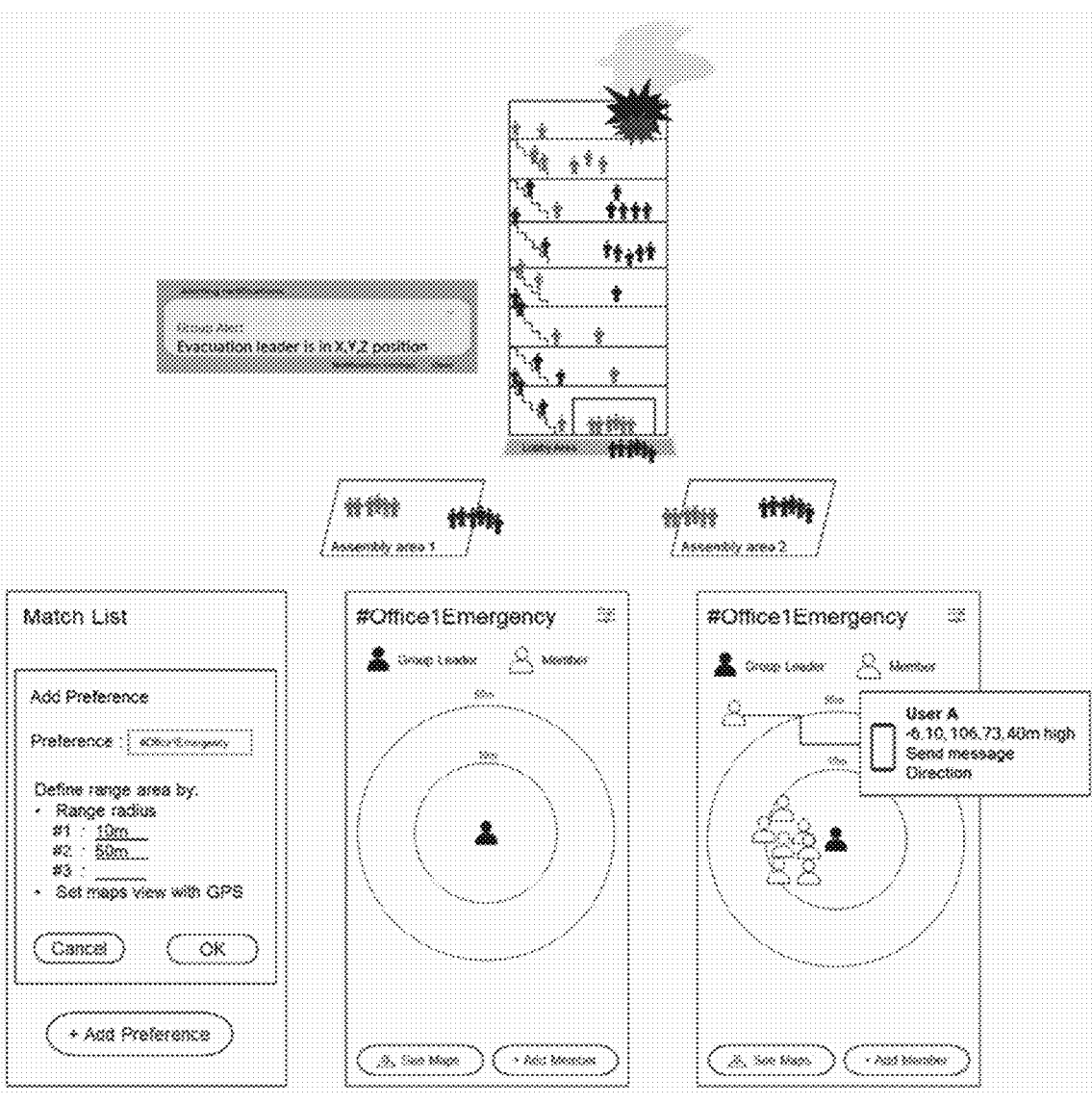
FIG. 11 is a sample use case scenario for evacuation grouping in an emergency situation, according to an embodiment.

Referring now to FIG. 11, FIG. 11 illustrates a use case scenario for Clustering & Matching feature during an evacuation process when a natural disaster has occurred, according to an embodiment. During this situation, it is essential to stay close with family, friends or coworkers as a group. When a natural disaster happens, a network connection is usually interrupted and the natural disaster thus may cut off communication with others. In a panic situation, lots of people are scattering everywhere and separated from their group. The system according to some embodiments may help separated people find and match to their group by providing accurate location so the separated people can find each other. As shown in FIG. 11, to use the Clustering & Matching feature, a group leader can add a preference to describe the group, and set a dynamic area range or maps of the evacuation area. The leader may wait for any notified user with the same preference to consent to their location sharing. Members can look for any preference that matches with their preference, and give consent to the leader to show their location and path direction.

Figure 12:
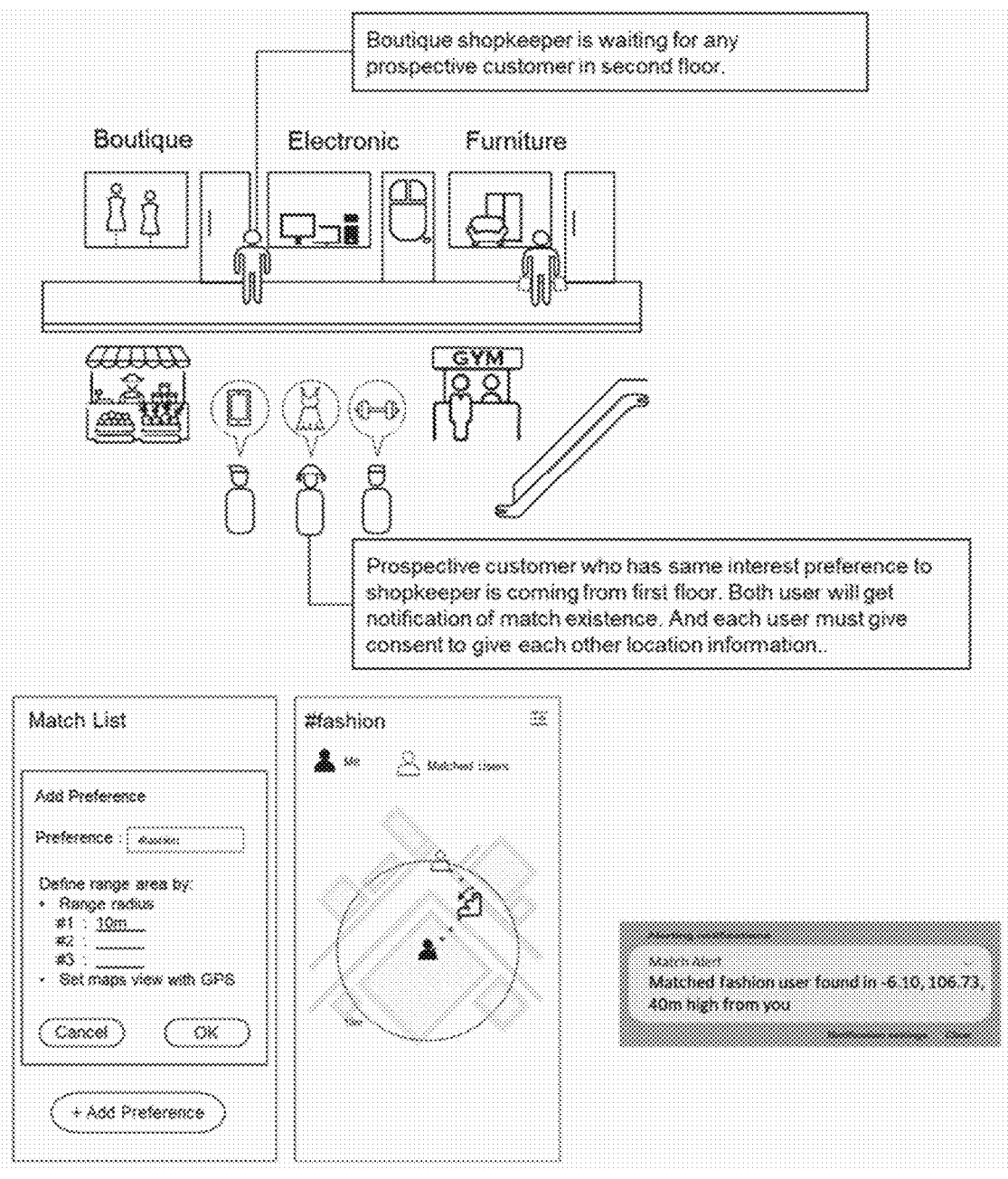
FIG. 12 is a sample use case scenario for a shopkeeper to find a matching customer prospective, according to an embodiment.

Referring now to FIG. 12, FIG. 12 illustrates a use case scenario for Clustering & Matching feature for shopkeepers to find matching prospective customers, according to an embodiment. The system according to some embodiments may help sellers to attract customers, and also may help customers to search for a shop to buy products they like or are looking for. Sellers can find other users with the same preferences. For an example, there is a boutique shopkeeper that sells fashion items. Shopkeeper can locate other users or buyers with the same preference "Fashion" that also has an interest to meet up. This will help the seller to get prospective customers. As shown in FIG. 12, the Clustering & Matching feature can help a shopkeeper to find matching prospective customers when both shopkeeper and customers have selected "Fashion" as one of the preferences to be matched. Shopkeeper can specify the dynamic range area to search for matching users. The system may notify other users with the same preference in the specified matching area range. The customers may be notified and asked for consent to show their locations. When consented, both shopkeeper and customers may be matched and the shopkeeper and customers can view the position information and obtain a direction to each other.

Figure 13:
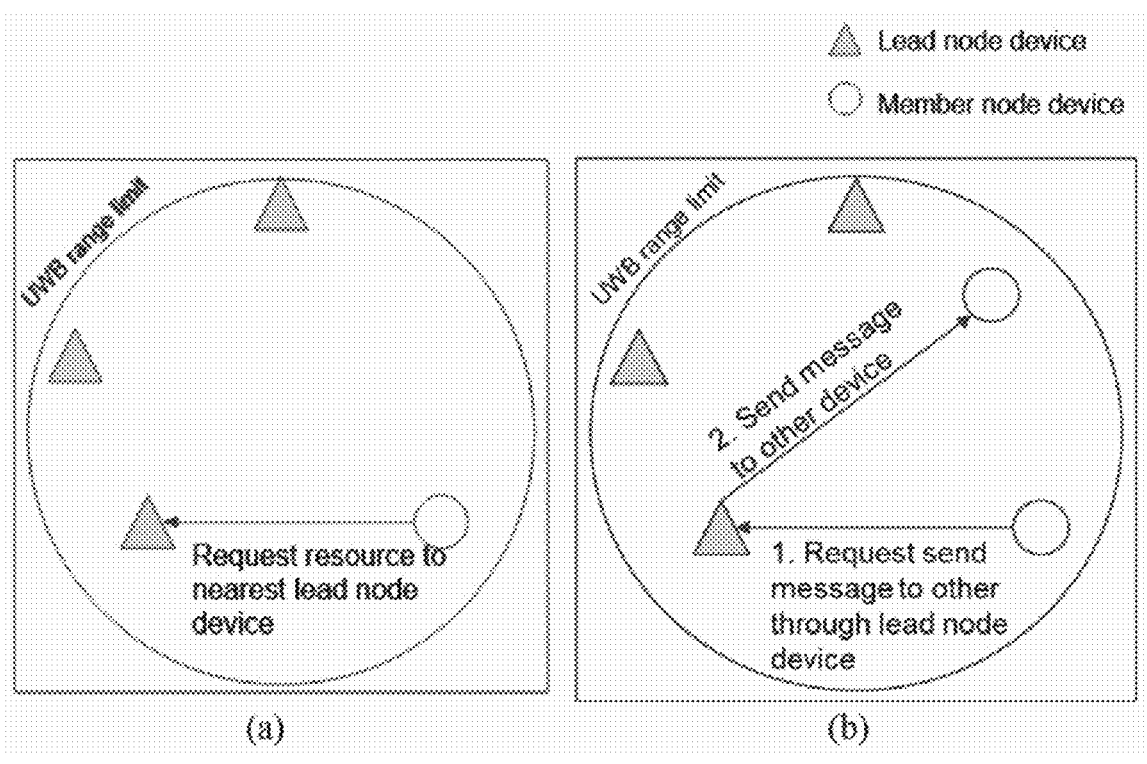
FIG. 13 is the illustration of a resource sharing feature in the multi lead technology, according to an embodiment.

Referring now to FIG. 13, FIG. 13 illustrates an example of an Area Data Sharing feature of Multi Lead Technology, according to an embodiment. Users can send data such as images, data, maps, and any other resources to the nearest node within the UWB range limit. In the system according to some embodiments, the resource sharing technology may use the lead node device as a hub to the others' member devices. As shown FIG. 13, the resource sharing technology starts with a member node requesting a resource to the nearest lead node device, then the lead node will share the resource if the lead node is available on the device. However, if the requested resource is not available on the lead node device, the lead node will broadcast to both member and lead nodes, and request the resource. The lead node or member node that has the resource then sends the resource to the lead asking for the resource and the lead will send the resource to the member node that needs the resource. Another scenario for resource sharing is for communication between members, or between members to lead node, or the lead can also broadcast message to all members. This technology can be implemented for the intended node, both lead or member node, and also broadcasting.

Figure 14:
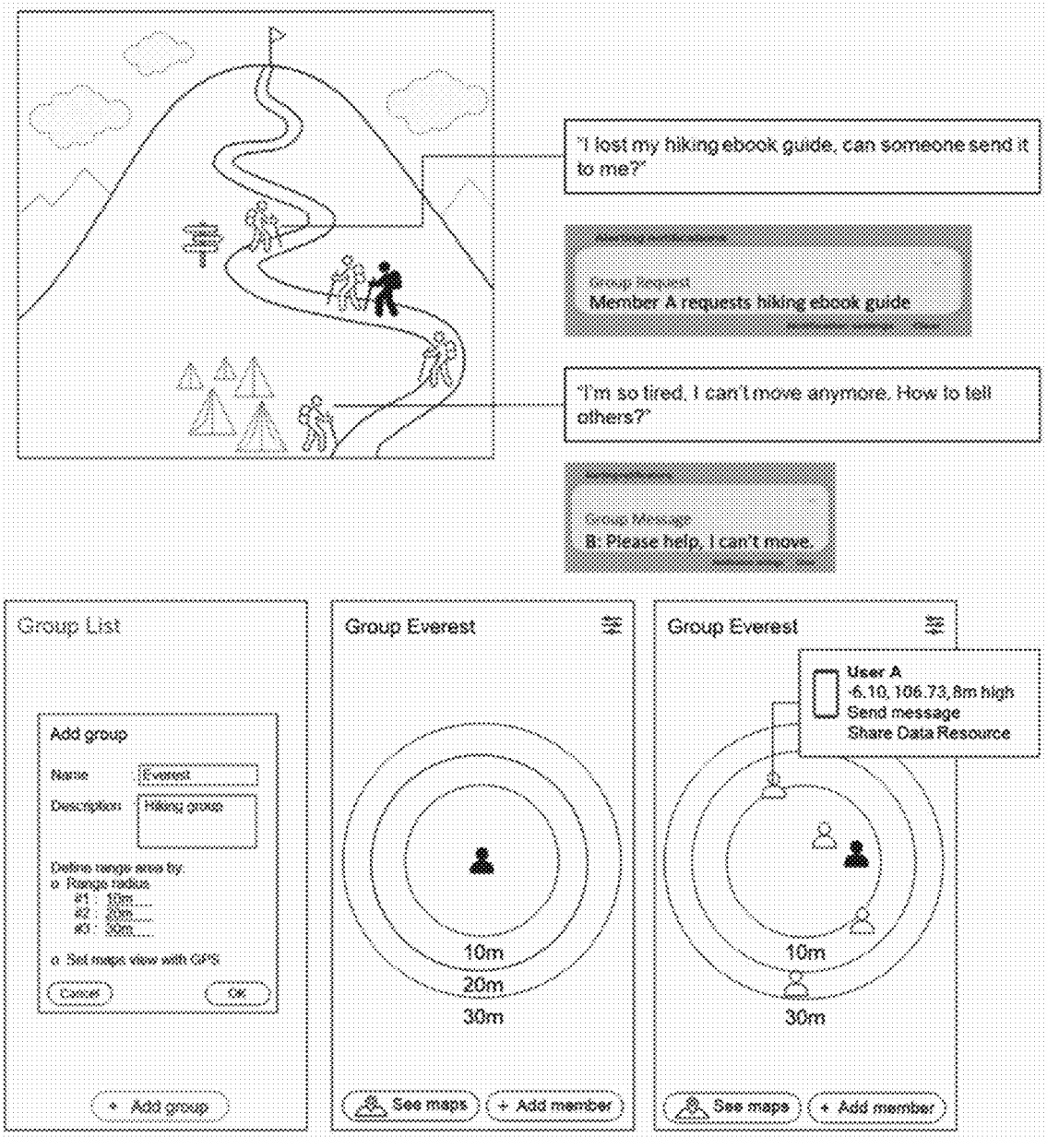
FIG. 14 is a sample use case scenario for resource sharing to communicate in a hiking group, according to an embodiment.

Referring now to FIG. 14, FIG. 14 illustrates an example of a use case scenario for using Clustering & Matching for communication during mountain hiking, according to an embodiment. A mountain is a remote place that frequently has no access to GPS and no internet connection. It is also dangerous when a person is separated with the group, getting left behind or lost. The worst case is the person cannot send messages to others, and the person does not know the direction to others. With Multi Lead Technology, members can share each other's accurate location, including height difference, communicate with each other, and share data resource or messages. As shown in FIG. 14, FIG. 14 illustrates a scenario for a hiking group when there is a person who has forgotten the direction to the peak, and another person is left behind. Embodiments can help these two people by setting up a group in the system. A leader can add a group and set a dynamic area range, and add members to his group. Members can see each other's location and share data resources within an application.

Figure 15:
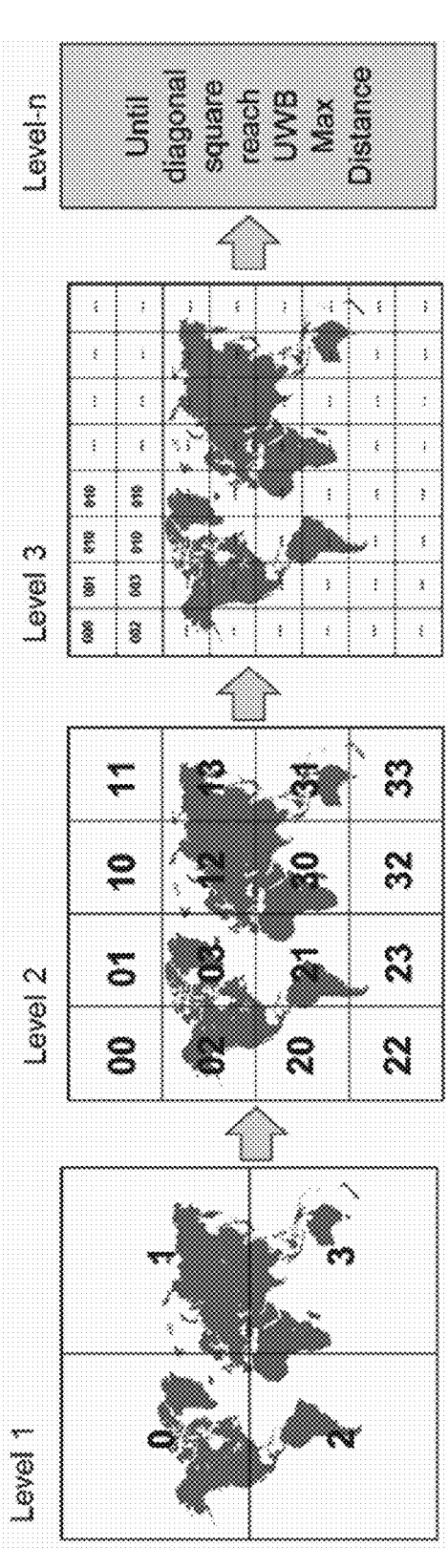
FIG. 15 is Geohashing Level diagram, according to an embodiment.
Figure 16:
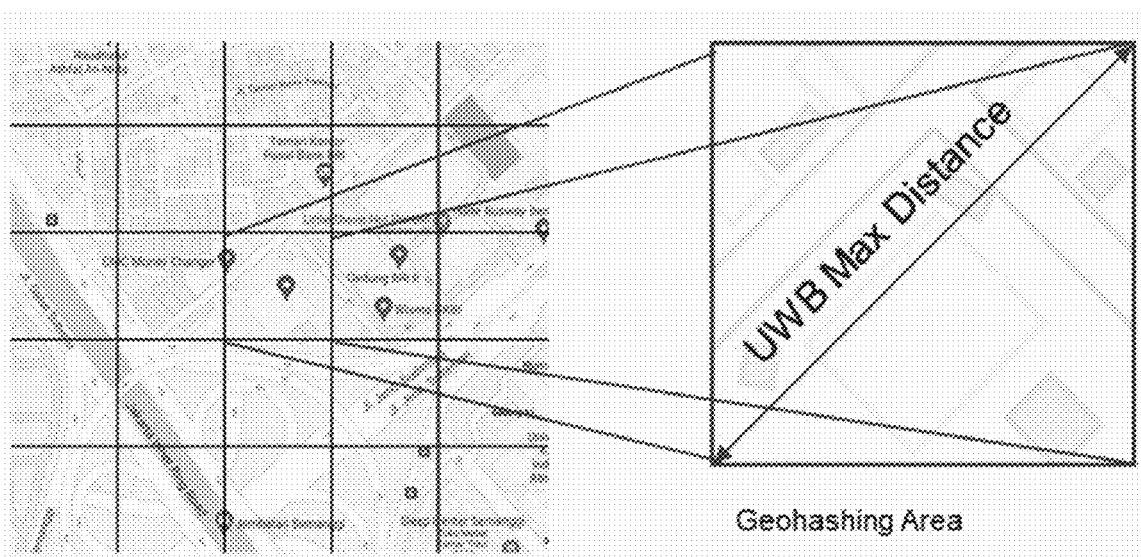
FIG. 16 is a simulation of a diagonal distance of a grid, according to an embodiment.

Referring now to FIG. 15 and FIG. 16, FIGS. 15 and 16 illustrate an example of the Geohashing Server module according to some embodiments. Geohashing is a geocoding method used to encode geographic coordinates into digits or letters of an area on a map. As shown in FIG. 15, the Geohashing Server will divide the earth into several grids, and each previous grid division is used to create a smaller grid cluster, and so on. For example, as illustrated in FIG. 15, at a Level 1, the whole world may be divided into four divisions 0-3. At a Level 2, a division 0 from Level 1 may be further divided into four divisions 00-03, and a division 1 from Level 1 may be further divided into four divisions 10-13, and so on. The division may continue until Level-n where a diagonal square reach of a UWB maximum distance is reached. FIG. 16 illustrates the diagonal distance grid to simplify the calculation process by limiting the area of calculation to only the size of a diagonal distance that is equal to the maximum distance of UWB, herein referred to as a geohashing area.

Figure 17:
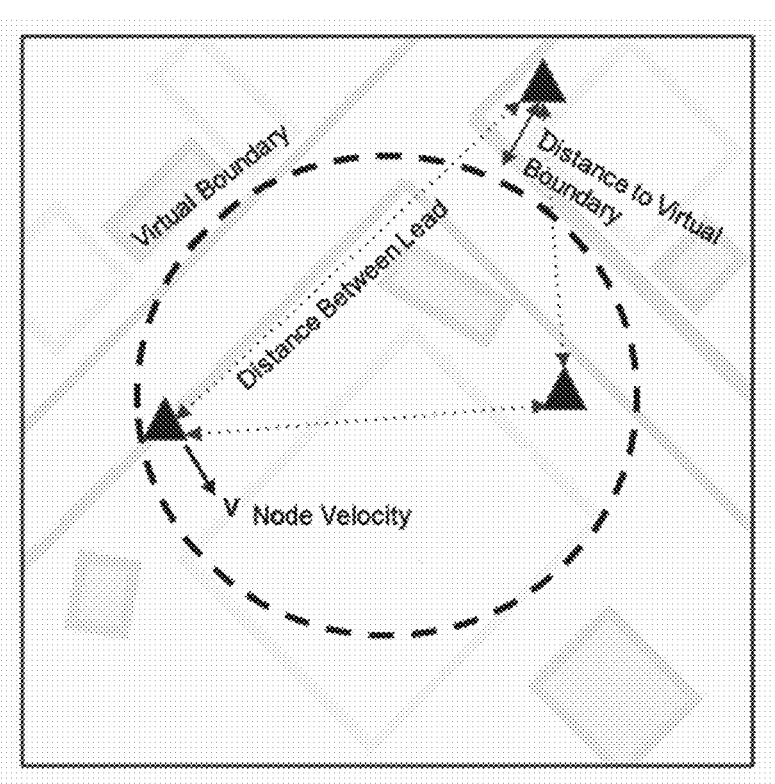
FIG. 17 is a simulation of parameters in geohash area to decide a lead, according to an embodiment.

Referring now to FIG. 17, FIG. 17 illustrates an example of the Lead Selection module, according to some embodiments. The Lead Selection module will focus on finding leads using predefined parameters and a weight calculation. In some embodiments, the parameters and weightings may be used to choose leads in a geohash area. To define leads, there are several parameters that may be considered. A first parameter is Silhouette Values to determine which node has the smallest density that is the furthest from dense area. It is advantageous if the silhouette values are as small as possible, which means each lead is further ahead from the other nodes. The smaller the value, the higher the score will be. A second parameter is Distance Between Lead. The distance between lead should be far enough to handle GPS measurement error. The higher the value, the higher the score will be. A third parameter is Distance to Virtual Boundary to determine a virtual boundary. The virtual boundary is an area that is set to keep the lead in representative area, which is not too centered or to the side of geohash area to ensure that each lead can cover wider area. The smaller the distance to the boundary, the higher the value will be. In some embodiments, the virtual boundary may be set manually. A fourth parameter is Node Velocity, in which the leads should not have high velocity to minimize IMU measurement error. The smaller the velocity, the higher the score will be. A fifth parameter is Battery Percentage, as it is advantageous if all leads have a high battery percentage to handle all calculation and data resource sharing. The higher the battery percentage, the higher the score will be. A sixth parameter is Signal Strength, where it is advantageous if each lead has a high signal strength percentage to handle all calculation and data resource sharing. The higher the signal strength, the higher the score will be. A seventh parameter is System Usage, where it is advantageous if each lead has a low system usage percentage to handle all calculation and data resource sharing. The lower the system usage, the higher the score will be.

Figure 18:
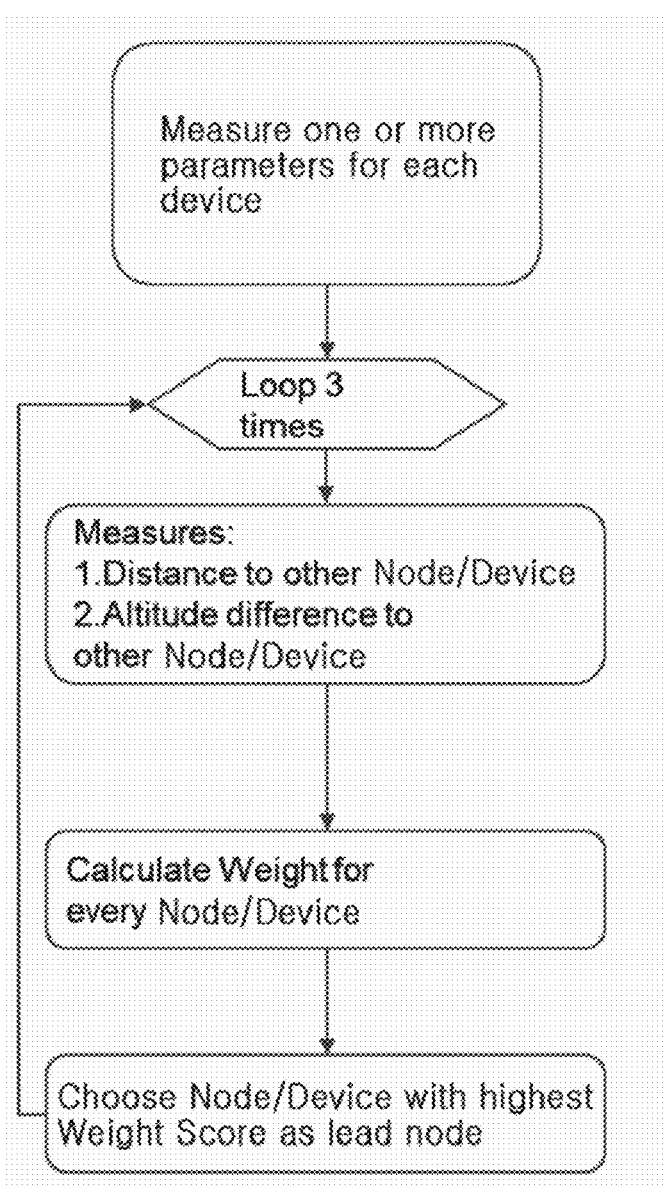
FIG. 18 is flow chart of a Lead Selection module, according to an embodiment.

Referring now to FIG. 18, FIG. 18 illustrates an example of a flow chart of a Lead Selection module. For the initial state, the system will measure one or more parameters related to each device. For example, in some embodiments, the system may measure parameters, such as a silhouette value, a distance to the boundary, a phone behavior, and a phone state, related to each device. For example, in some embodiments, to identify the leads, it is advantageous if all representative devices have a far distance to each other and the same altitude with each lead for the next calculation by the Lead Position Enhancement module. In some embodiments, the selection process may be done three times by measuring a distance to another node/device and an altitude difference to the another node/device, calculating the weight for every node, and choosing a lead node with a highest Weight Score. In some embodiments, the selection process may be done three times simultaneously. In some embodiments, the weight score (Score) may be calculated using the formula below. Devices with high score values will be chosen as leads. For example, in some embodiments, a device with a highest score value may be chosen as a lead. In some embodiments, a device with a score value above a threshold may be chosen as a lead. The threshold may be set experimentally or dynamically in real time.

$$Score=(1-f_1(s_V))*w_1+f_2(d_b)*w_2+f_3(d_s)*w_3+ \\ (1-f_4(d_h))*+(1-f_5(V))*w_5+f_6(b)*w_6+f_7(s_s)*w_7+ \\ (1-f_8(s_u))*w_8$$

Figure 19:
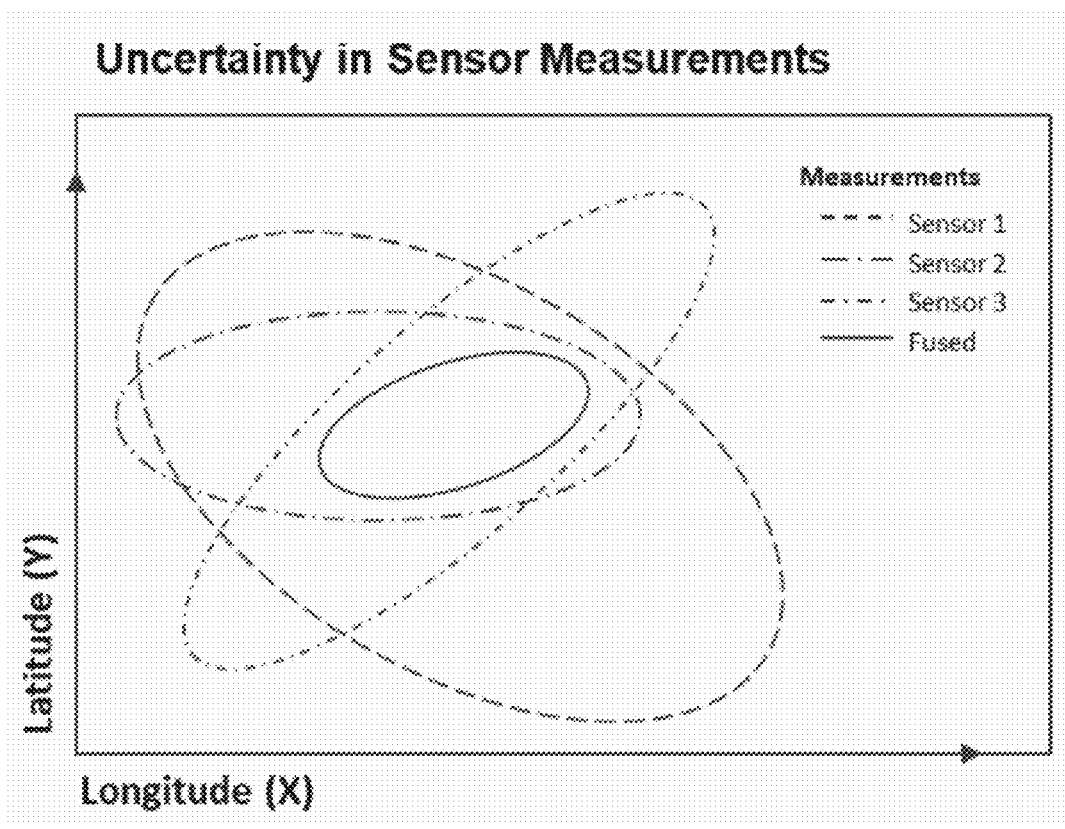
FIG. 19 is a simulation of uncertainty in sensor measurements, according to an embodiment.
Figure 21:
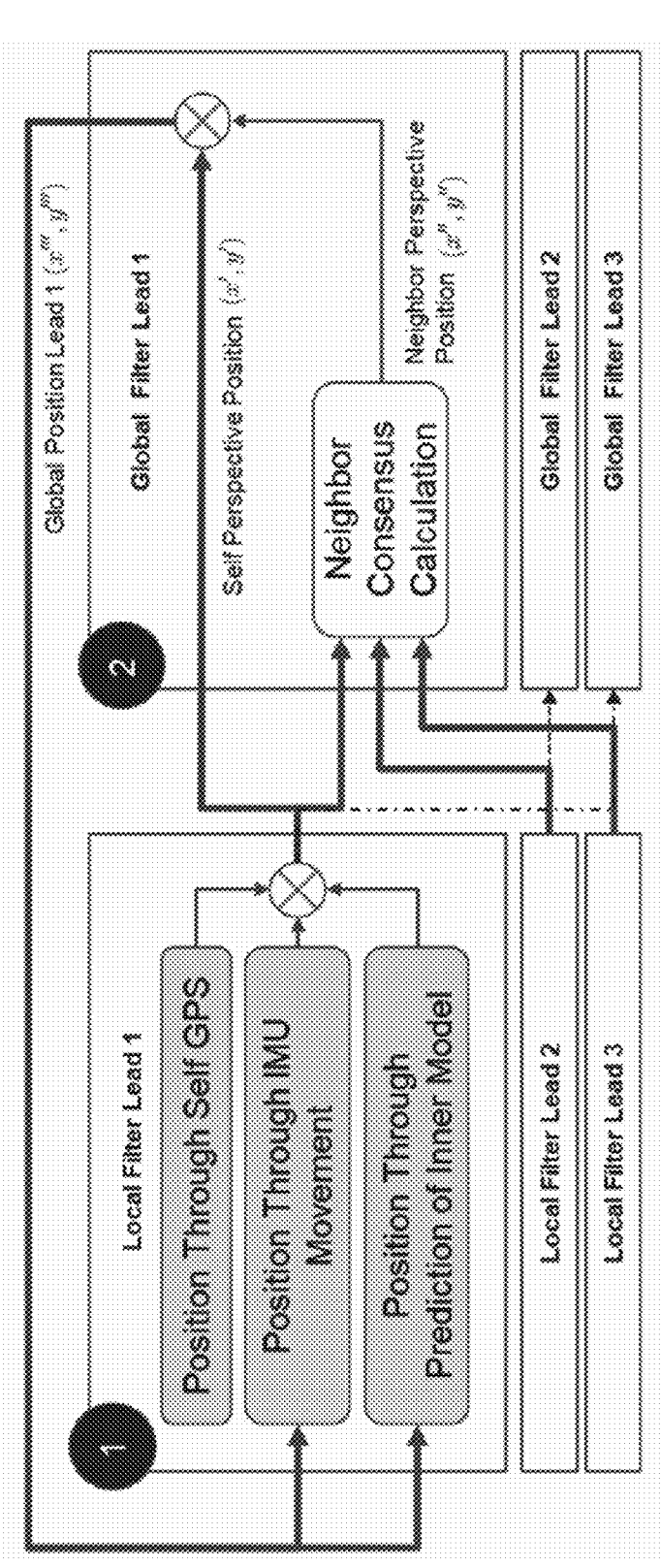
FIG. 21 is an overview of Lead Enhancement, according to an embodiment.

Where:
$s_V$=Silhouette Value
$d_b$=Distance to Boundary
$d_s$=Distance to Other lead
$d_h$=Height Difference to other lead
$v$=Node Velocity
$b$=Battery Percentage
$s_s$=Signal Strength
$s_u$=System Usage
$f_i$=Normalize Function, output will be 0~1
$W_i$=Weight factor Referring now to FIG. 19 to FIG. 25, FIGS. 19-25 the Lead Position Enhancement module. With the multi-lead technology, the Lead Position Enhancement module can enhance the accuracy of all leads. In general, the multi-lead technology combines several measurements, herein referred to as sensor fusion, to get a better position accuracy. With this method, a measurement of one sensor will cover the weakness or uncertainty of measurement(s) by other sensors, as shown in FIG. 19. In the Lead Position Enhancement module, the system will limit the calculation only for Latitude (y) and Longitude (x) because this calculation is only valid if all leads are in the same height, which were determined from the previous step on lead selection calculation to decide leads. The method can use one of sensor fusion algorithms, for example, a Kalman Filter, a Bayesian Network, a CTL, a Convolution Neural Network, etc. to combine Latitude (x) and Longitude (y) for each measurement. One of the example formulas for sensor fusion is shown in FIG. 20. As the overview of the lead position enhancement model described in FIG. 21, a decentralized consensus method may be used to enhance the accuracy of the position. The method combines two perspectives of measurement, the self-perspective in local filter and neighbor-perspective in the global filter, and combining the self-perspective and the neighbor-perspective allows these two perspective to correct each other and thus get better positions accuracy. The processing for both local and global filters is done on each lead.

Figure 22:
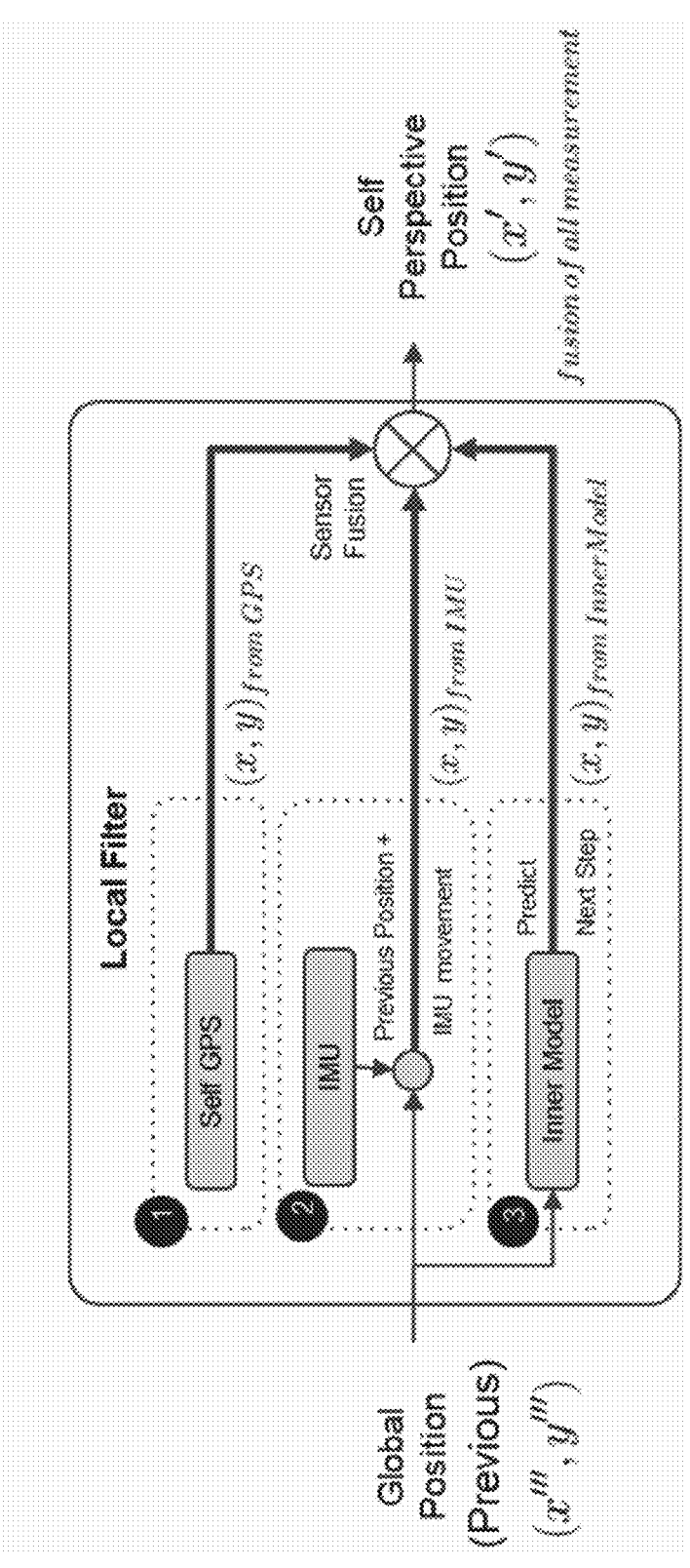
FIG. 22 is a diagram of a Local Filter, according to an embodiment.
Figure 23:
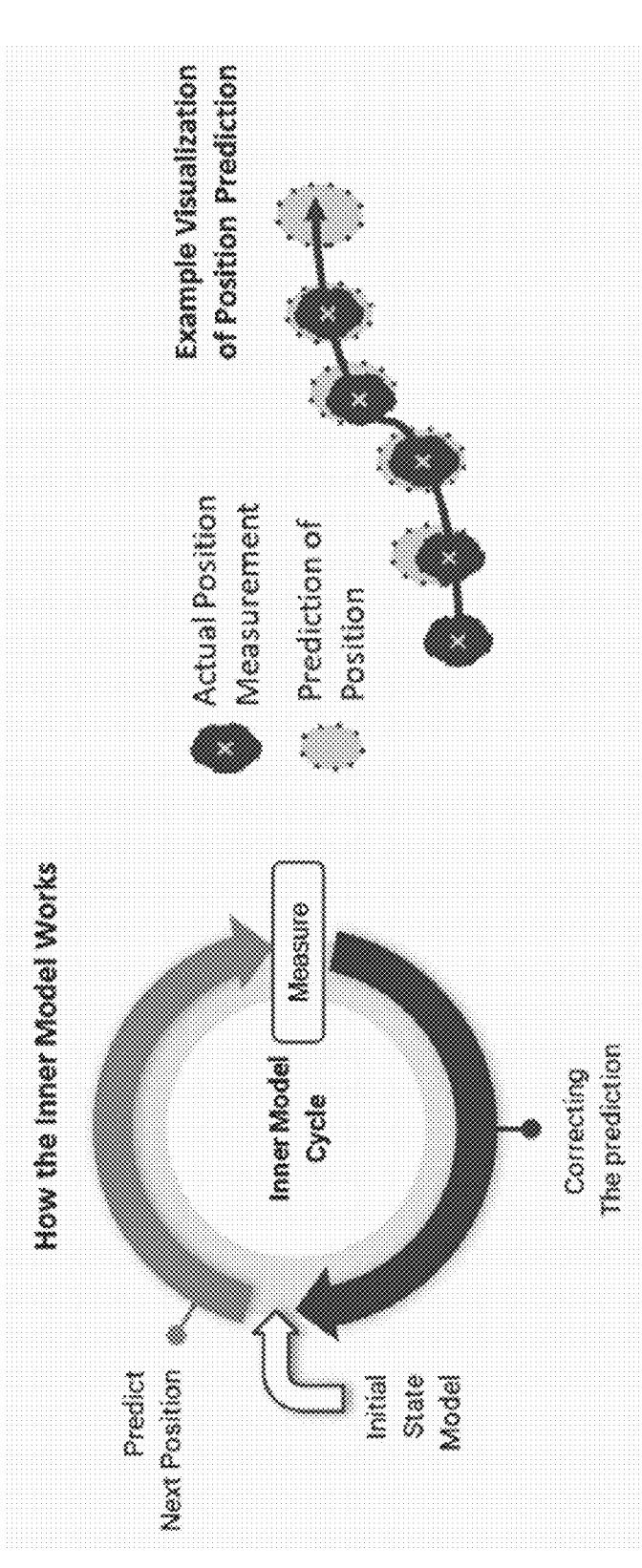
FIG. 23 is a diagram of an Inner Model Mechanism, according to an embodiment.

As shown in FIG. 22, FIG. 22 illustrates an example of the Local Filter submodule, according to some embodiments. In the Local Filter submodule, the system will get the self-perspective position by combining only inner measurement and model, herein after referred to as self-perspective. In some embodiments, the Local Filter may use position through self GPS, IMU and Inner model to calculate the measurement and models in Local Filter. Despite having small accuracy, GPS can be used as a parameter in a sensor fusion calculation. IMU is a type of sensor that can calculate the movement of the object. The IMU sensor can be used for sensor fusion by adding the previous global position and the movement. The Inner Model is used to predict the position based on the previous state. The inner model is a model that always predicts and corrects its prediction. This process can be done with a Kalman Filter or a statistics/machine learning model, as shown in FIG. 23.

Figure 24:
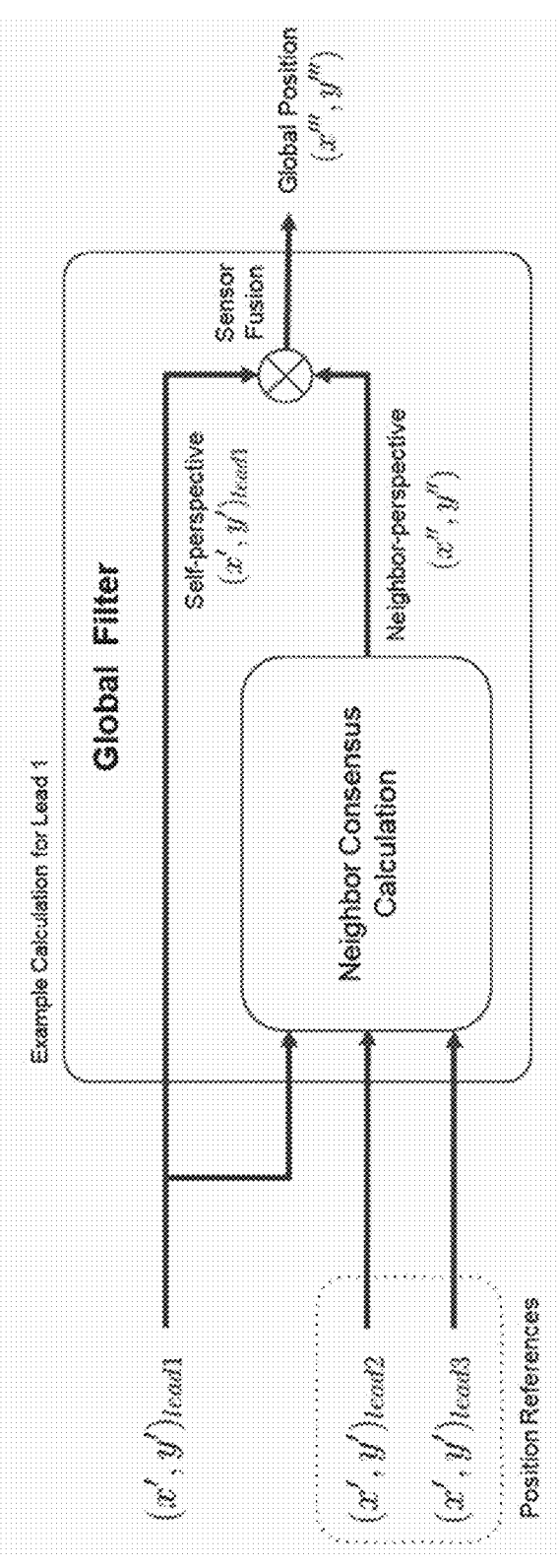
FIG. 24 is a diagram of a Global Filter, according to an embodiment.
Figure 25:
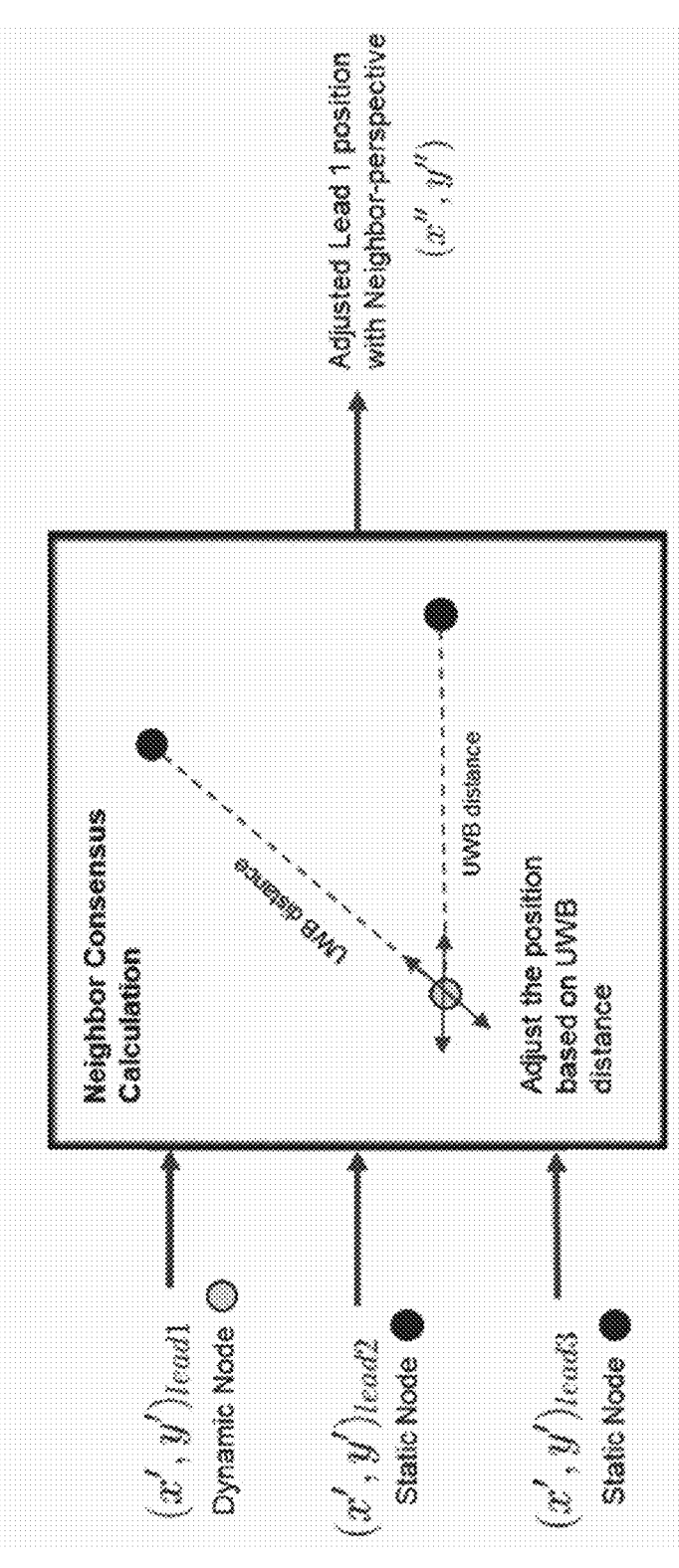
FIG. 25 is a diagram of a Neighbor Consensus Calculation, according to an embodiment.

Referring now to FIG. 24, FIG. 24 illustrates an example of the process for Global Filter calculation, according to some embodiments. The idea of a global filter is to get a more reliable position by combining the Sensor Fusion between Self-perspective and Neighbor-perspective positions (x, y). Therefore, all leads will introspect their position to each other. Self-perspective position is the position from internal measurement by combining GPS, IMU and Inner model in the Local Filter. Neighbor-perspective position is the position from a Neighbor Consensus Calculation submodule which utilizes a position of another lead as a reference and calculates its position relative to the other lead using UWB. As shown in FIG. 25, a neighbor consensus calculation is used to get a neighbor-perspective location. The Neighbor Consensus Calculation submodule uses other leads positions as a reference and calculates its position relative to the other leads using UWB. By using this method, the dynamic device/node may adjust its position to other devices, referred to as Static Node, and be assisted by UWB which has good accuracy in calculating distances. In order to calculate this method, it is advantageous if the system ensures that each lead has a similar altitude, which has been determined from the previous step.

Figure 26:
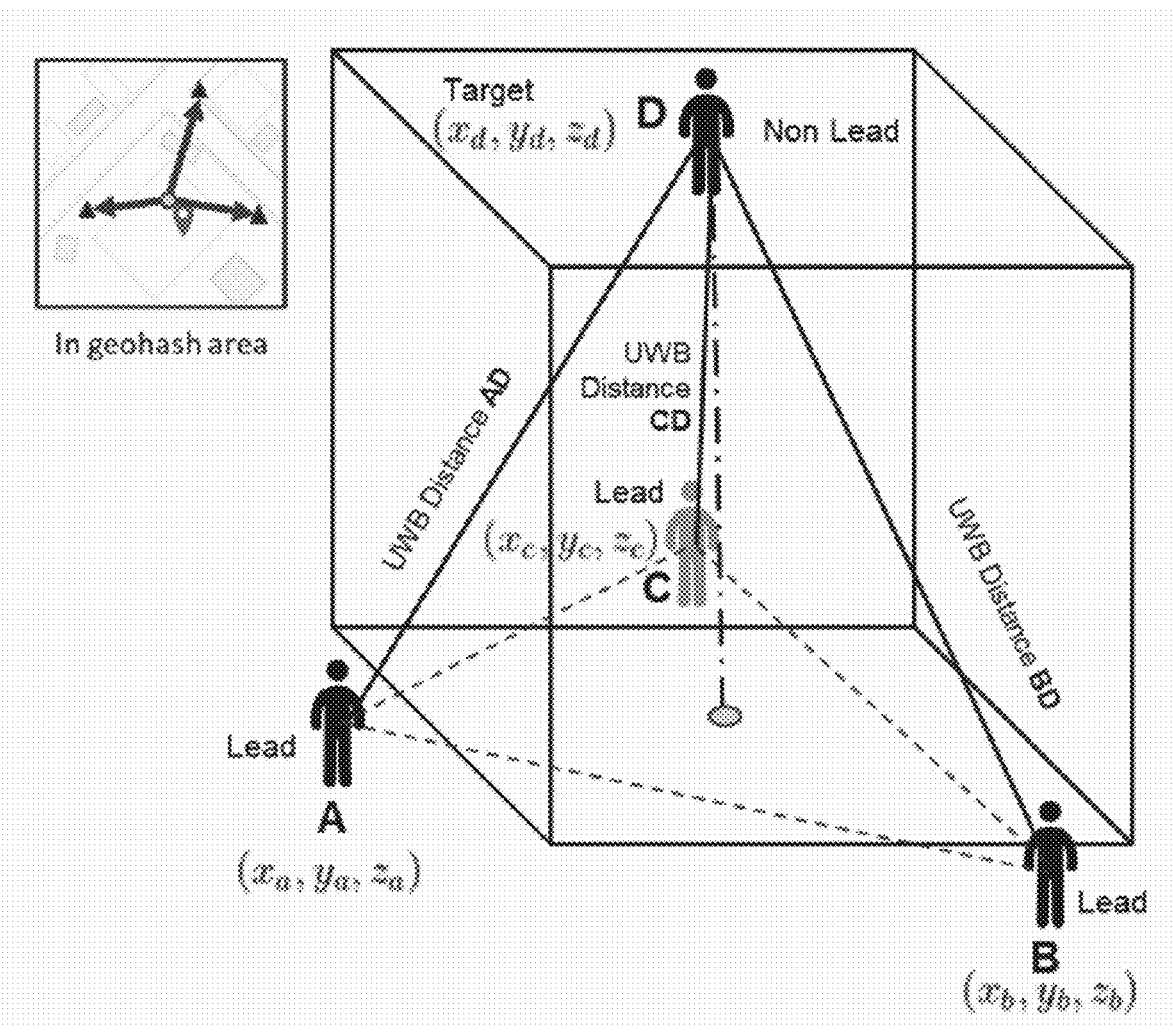
FIG. 26 is a diagram of a Non-Lead Position Calculation, according to an embodiment.
Figure 27:
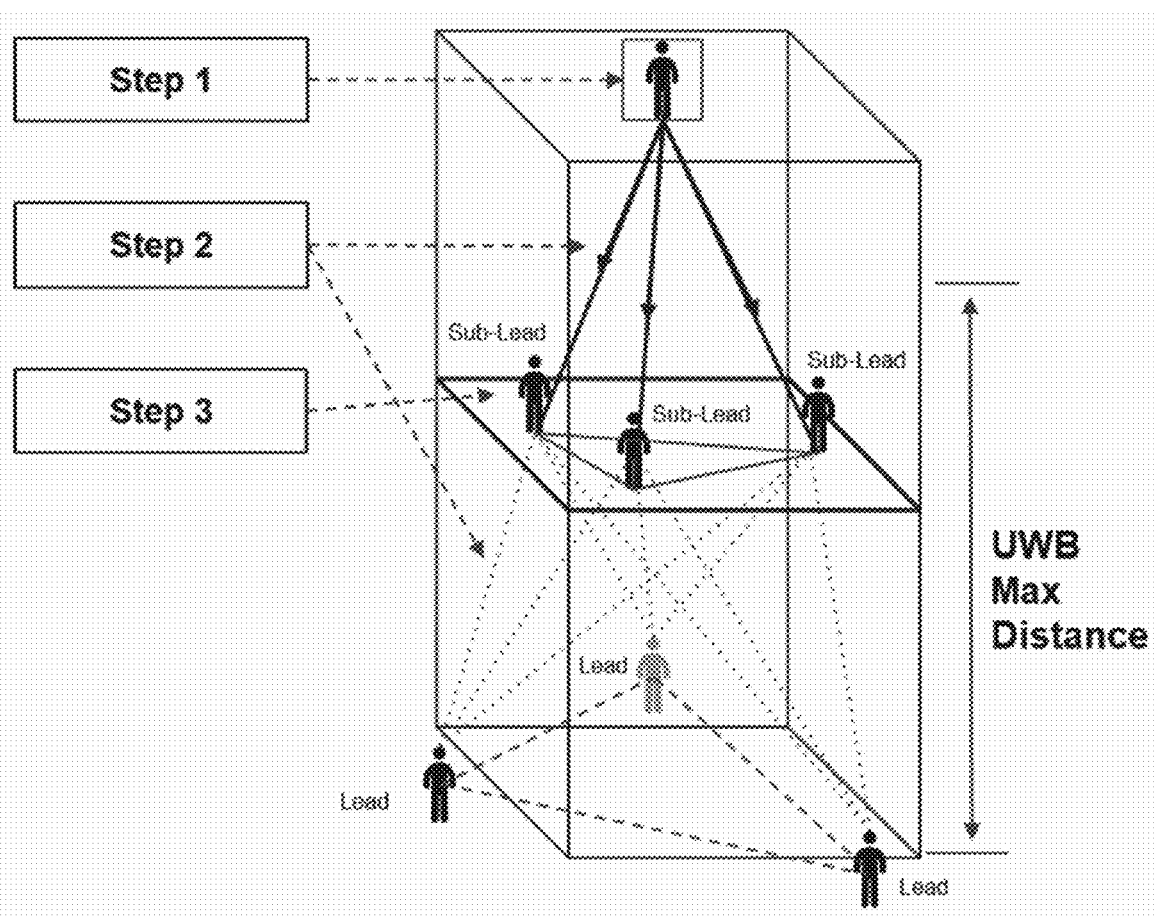
FIG. 27 is a diagram of a Non-Lead Position Calculation for an edge case, according to an embodiment.

Referring now to FIG. 26 and FIG. 27, FIGS. 26-27 illustrate an example of the Non-lead Position Calculation, according to some embodiments. For a non-lead position calculation, rather than using the static anchor, leads are used as the virtual anchor and trilateration is used to calculate the position. To determine the location, the calculation is separated based on two cases. FIG. 26 describes the calculation in a general case. The shape of the problem in non-lead calculation can be simulated in the shape tetrahedron. Therefore, a tetrahedron formula is used to determine a non-lead position. The system can then get A, B, and C coordinates using lead position enhancement. Thus, in order to get $\{x\_d, y\_d, z\_d\}$ coordinates, the system will use the below equation for 3 spheres with radii being the lengths of the 3 tetrahedron legs going out of the plane. This formula below may be applied to irregular and oblique tetrahedron shapes too:

$$(x_d-x_a)^2+(y_d-y_a)^2+(z_d-z_a)^2=AD^2$$

$$(x_d-x_b)^2+(y_d-y_b)^2+(z_d-z_b)^2=BD^2$$

$$(x_d-x_c)^2+(y_d-y_c)^2+(z_d-z_c)^2=CD^2$$

As shown in FIG. 27, FIG. 27 illustrates an example of the non-lead position calculation for an edge case, according to some embodiments. There is a case when a device is in the geohash area but not detected by a lead. This problem can be caused when the height of the device is more than a UWB range of the leads. To solve this problem, the system may promote several non-leads into sub-leads and the sub-leads may behave as a reference point or virtual anchor. The sub-leads only broadcast their positions and do not do the calculation enhancement because their positions are already enchanted. This case only appears if any non-lead position is in the geohash area and is out-of-range to the lead. The non-lead may start broadcasting and searching the other non-leads in their UWB range. If the others are also out of range from the lead, they may start broadcasting too until they find all leads. The sub-lead is determined based on their parameters weight for lead and the nearest range with the out-of-range non leads. Once there are at least 3 non leads with direct connection to lead, the 3 non-leads will be promoted as sub-leads which will act similar with the leads as virtual anchors, except the sub-leads are only responsible to broadcast their position to the out-of-range non leads.

Figure 28:
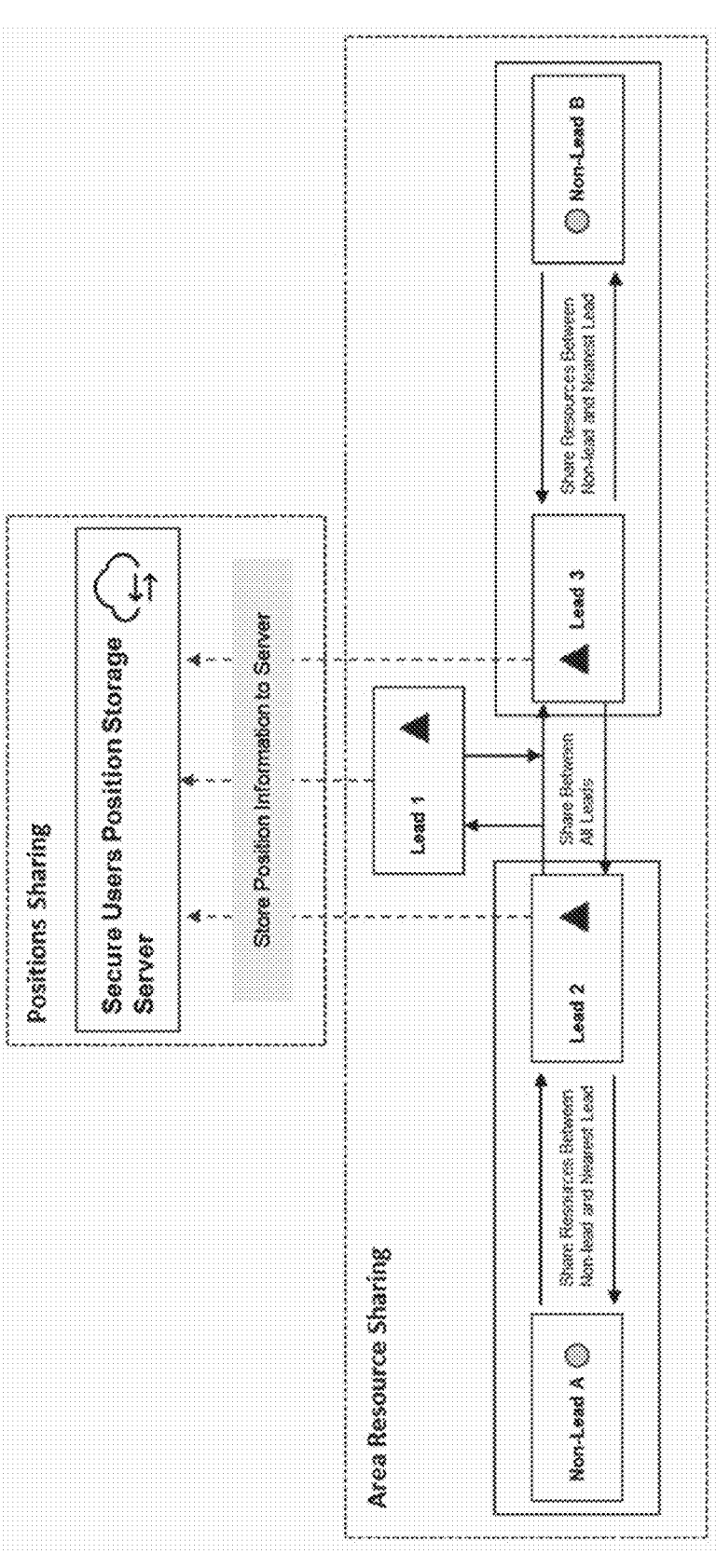
FIG. 28 is an overview of Positions and Area Resource Sharing, according to an embodiment.
Figure 29:
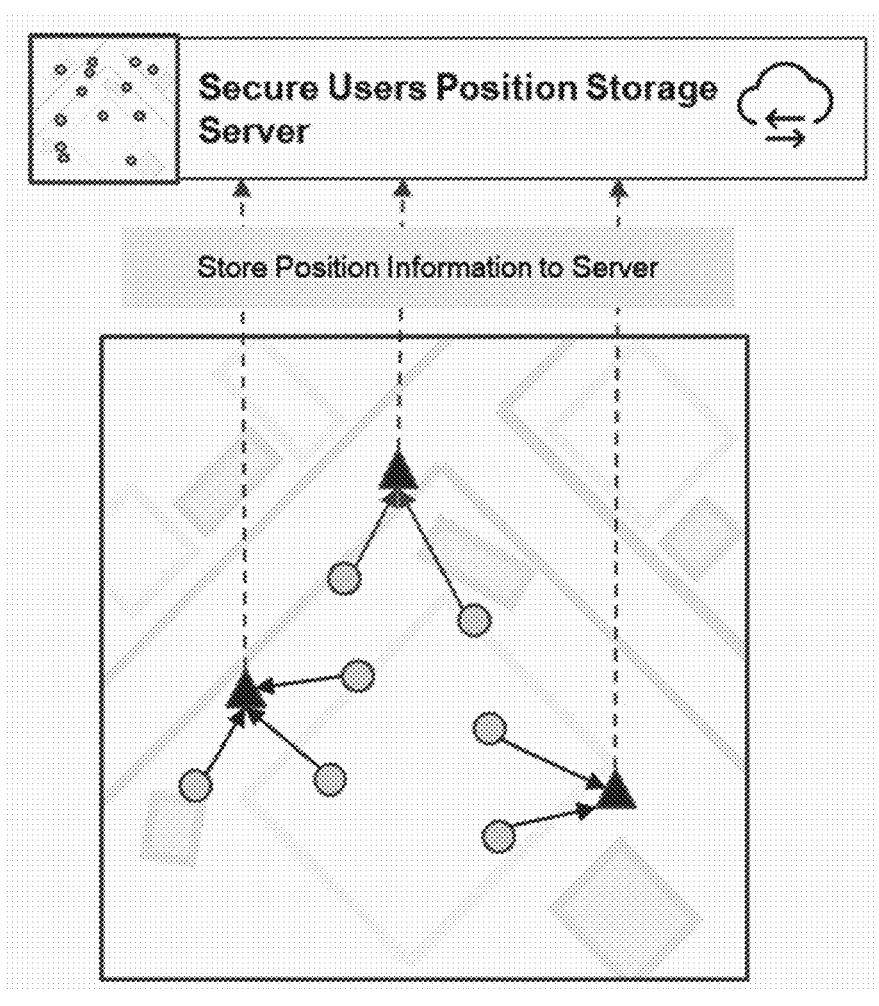
FIG. 29 is a diagram of Positions Sharing, according to an embodiment.
Figure 30:
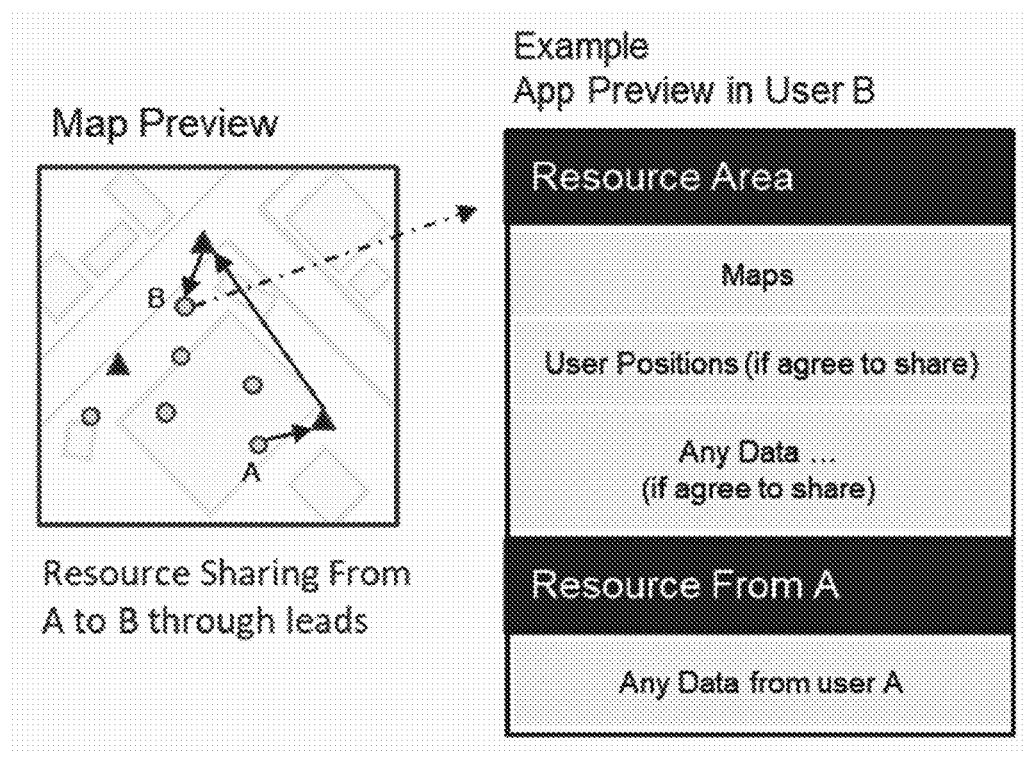
FIG. 30 is a simulation of resource sharing from A to B through leads, according to an embodiment.

Referring to FIG. 28 to FIG. 30, FIGS. 28-30 illustrate an example of the Positions and Resource Sharing module, according to some embodiments. In the Positions and Resource Sharing module, the sharing may take place. The sharing process of positions and data will be easier since all information is centered on the leads, as shown in FIG. 28. For the positions sharing module, all information is centralized on the nearest leads, as illustrated in FIG. 29. While measuring its position against all leads, non-leads simultaneously share their current position with the leads. With this method, the system only gets the position through leads. As shown in FIG. 30, with a multi-lead technology according to some embodiments, all information is manageable and accessible between lead and non-lead. Non-leads may share their resources through the leads and the leads forward the resources to other devices. This configuration also can help for managing group sharing because all data is centered into the lead.

Figure 31:
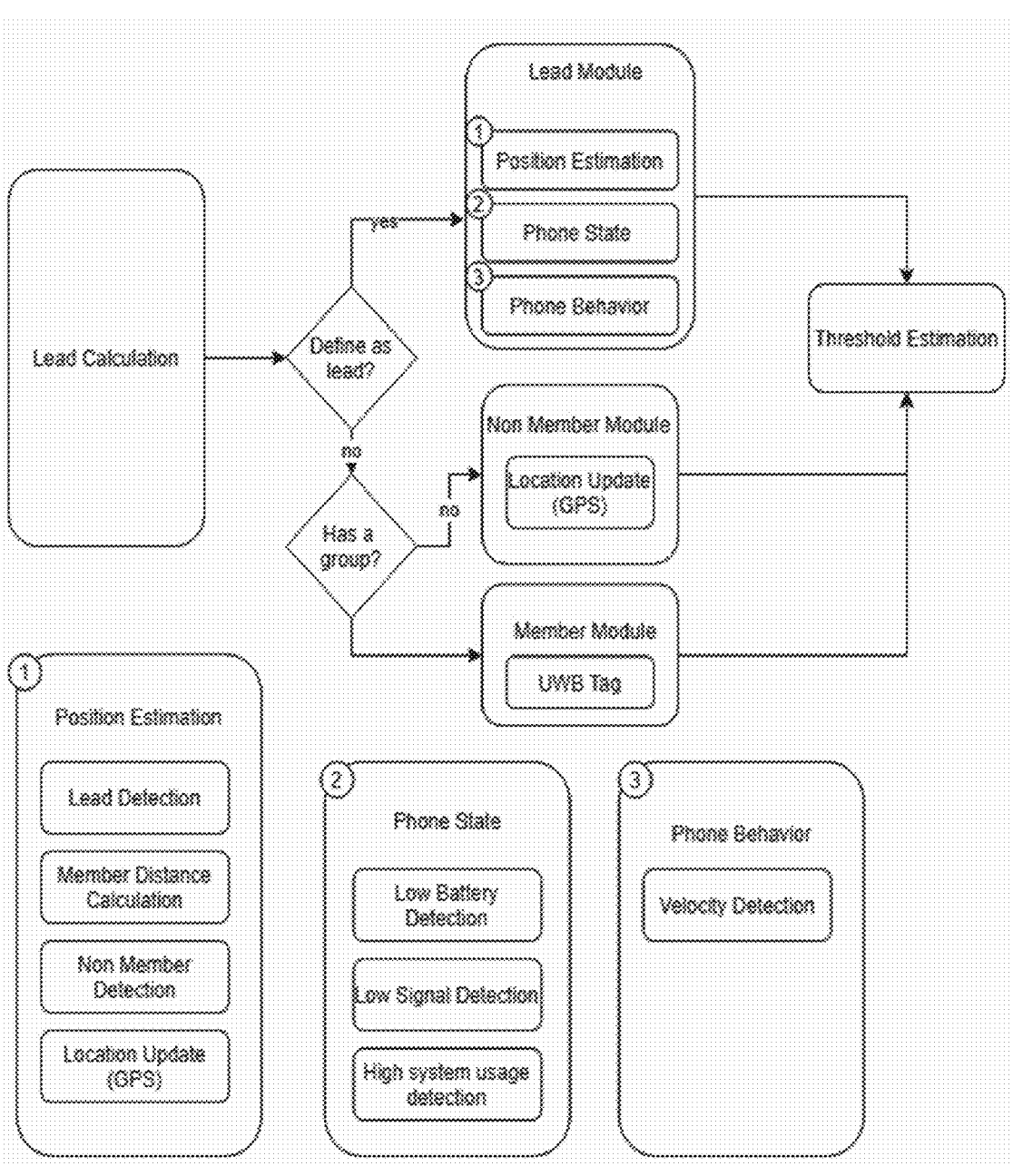
FIG. 31 is a diagram of Parameter Update and Threshold, according to an embodiment.

Referring to FIG. 31, FIG. 31 illustrates an example of the Parameters Update & Threshold module, according to some embodiments. After doing all the calculations between leads and non-lead, the system will do a parameter update and threshold to recalculate the lead selection. There are several parameters which are updated when the system is running. The parameter update is divided into two submodules, a Lead submodule and a Non-lead submodule. The lead submodule may estimate the position to detect other leads, measure distance to a member, detect a non-member node, and update location. The Lead submodule may also monitor the phone state to update battery, signal strength and system usage of the phone, and also monitor the phone's behavior to measure phone velocity. For the non-lead module, the system will use GPS to update the location for the non-member, and use a UWB tag to calculate the distance between the non-lead and the lead for a member. The recalculation is triggered when one of the following criteria is met: every period of time, i.e. second, minutes, or hour; when a lead cannot detect other leads; when lead phone state reaches a certain threshold, i.e. battery, signal strength, system usage; and when a lead phone movement reaches a certain speed, for example above 40 km/h.

Thus, it should be understood that the present disclosure is not limited to the above embodiments, but various other changes and modifications may be made therein without departing from the spirit and scope of the appended claims.

What is claimed is:

1. A method comprising:

performing Geohash-based geofencing to define a geohash area;

selecting a plurality of lead devices among a plurality of devices in the geohash area, based on a plurality of measured parameters of each of the plurality of devices and based on a weight calculation performed on the plurality of measured parameters;

determining positions of the plurality of lead devices based on a decentralized consensus between a local filter and a global filter;

locating a position of each non-lead device among the plurality of devices in the geohash area, by using the plurality of lead devices as a virtual anchor to calculate a position of each non-lead;

sharing the positions and resources among the plurality of devices by centralizing all traffic data to the lead device, the lead device forwarding data to a network or to other devices among the plurality of devices; and updating the plurality of measured parameters and reselecting a plurality of lead devices among the plurality of devices in the geohash area, based on the updated measured parameters.

2. The method of claim 1, wherein the position of each non-lead device is located by using the plurality of lead devices as virtual anchors.

3. The method of claim 2, wherein the plurality of lead devices have a same altitude.

4. The method of claim 1, wherein the performing Geohash-based geofencing comprises:

iteratively dividing a geographic area into a plurality of grid divisions, and each grid division into a plurality of further grid divisions until a diagonal distance of each of the plurality of further grid divisions reaches a maximum distance of an ultra-wide band (UWB) sensor, wherein a further grid division whose diagonal distance has reached the maximum distance is used as the geohash area.

5. The method of claim 1, wherein the plurality of lead devices performs UWB Real-Time Localization on a moving group of devices among the plurality of devices by calculating an absolute position of the moving group, based on self global positioning system (GPS) data, Inertial Measurement Unit (IMU) data, and Inner model prediction, and non-lead devices locate their own positions using the plurality of lead devices as the virtual anchor as a reference.

6. The method of claim 1, wherein the plurality of measured parameters comprise a Silhouette value, a distance to a boundary of the geohash area, a behavior of the device, and a state of the device.

7. The method of claim 6, wherein the weight calculation comprises determining a weight score and is performed by:

performing a Silhouette Value calculation to determine the silhouette value which indicates a distance from a dense area in the geohash area, where a smaller Silhouette Value indicates a higher weigh score;

determining a distance between devices, where a higher distance indicates a higher weigh score;

measuring the distance to the boundary of the geohash area, where a smaller distance to the boundary indicates a higher weigh score; and calculating a velocity of each of the plurality of devices, where a smaller velocity indicates a higher weight score.

8. The method of claim 1, wherein the determining the positions of the plurality of lead devices comprises:

applying a local filter to determine a self-perspective position of the lead device by combining an inner measurement and an inner model, wherein the inner measurement is based on information from a GPS sensor and information from an Inertial Measurement Unit (IMU), and wherein the inner model predicts the position of the lead device based on a previous state of the lead device using a machine learning model;

applying a global filter to obtain position accuracy by applying a sensor fusion between the self-perspective position and a neighbors-perspective position, wherein the neighbors-perspective position is calculated by:

using a position of another lead device as a reference and calculating a relative position of the lead device relative to the another lead device; and adjusting the position of the lead device based on the relative position of the lead device relative to the another lead device or to other ones of the plurality of devices and based on ultra-wide band data from an ultra-wide band (UWB) sensor.

9. The method of claim 1, wherein the position of each non-lead device is located based on the plurality of lead devices as virtual anchors and based on a tetrahedron calculation.

10. The method of claim 9, wherein the tetrahedron calculation comprises:

calculating a coordinate position of each device of the plurality of devices;

calculating an equation for three spheres with radii being lengths of the tetrahedron legs extending out of a plane within the geohash area; and when a height of the each device is more than an UWB range of the lead device, one or more non-lead devices are promoted to sub-lead devices that act as virtual anchors and actively broadcast their positions.

11. The method of claim 2, further comprising enabling sharing position and resources among the plurality of devices by:

for each device of the plurality of devices, centralizing all traffic data of the device to a nearest lead device of the plurality of lead devices that is nearest to the device, measuring a position of the nearest lead device relative to all of the plurality of lead devices, wherein the non-lead devices share their current positions with the plurality of lead devices; and the plurality of lead devices forward the traffic data to a network or to other devices of the plurality of devices.

12. The method of claim 2, wherein the updating comprises:

updating a position of a lead device among the plurality of lead devices by estimating a position of another lead device, measuring a distance to a non-lead device corresponding to a member of a member group, detecting a non-lead device corresponding to a non-member that is not a member of the member group and updating a location, mobile device states, and mobile device velocity of the non-lead device corresponding to the non-member;

updating positions of non-lead devices or the non-lead devices corresponding to the non-members using GPS; and updating a position of the member using UWB by calculating a distance between the non-lead device of the member and the lead device;

triggering re-calculation dynamically based on a period of time, or based on when a lead device cannot detect other lead devices, or based on when a mobile device state of a lead device has reached a threshold, or based on when a mobile device velocity of a lead device has reached threshold speed.

13. A system for calculating position coordinates of a plurality of devices and enabling resource sharing between the plurality of devices using a dynamic multi-lead technology, the system comprising:

a geohashing server module that is configured to encode geographic coordinates into digits and letters of a geographic area by dividing a geographic area into a plurality of grids and successively dividing each of the plurality of grids to create a new grid cluster until a diagonal distance of a divided grid is equal to a maximum distance of an ultra-wide band (UWB) sensor;

a lead selection module that is configured to select, in a lead selection, a plurality of lead devices among of the plurality of devices within a geohash area corresponding to the divided grid, by employing pre-defined parameters and a weight calculation;

a lead position enhancement module that is configured to enhance a lead position of each lead device to obtain better accuracy by combining a self-perspective position measurement in a local filter and a neighbor-perspective position measurement in a global filter, the self-perspective position measurement and the neighbor-perspective position measurement continuously correcting the lead position of each lead device to obtain position accuracy;

a non-lead position calculation module configured to locate a non-lead position of each non-lead device of the plurality of devices by using the plurality of lead devices as a-virtual anchors and by using a tetrahedron calculation to calculate the non-lead position;

a position and area resource sharing module that is configured to enable sharing a positions and resources between devices of the plurality of devices by, for each device of the plurality of devices, centralizing traffic data of the device to a nearest lead device of the plurality of lead devices that is nearest to the device, such that the traffic data is forwarded to the Internet or to other devices of the plurality of devices; and a parameters update module that is configured to update the pre-defined parameters and a threshold parameter in the system in order to recalculate the lead selection.

14. The system according to claim 13, further comprising a geohashing server, and the plurality of devices, wherein the geohashing server module is implemented on the geohashing server, and wherein the lead selection module, lead position enhancement module, the non-lead position calculation module, the position and area resource sharing module, and the parameters update module are implemented on each of the plurality of devices.

15. The system of claim 14, wherein non-lead devices of the plurality of devices share resources and data with each other and with the network through UWB communication with the plurality of lead devices of the plurality of devices.

* * * * *